Oct. 6, 1959 W. W. WETZEL 2,907,818

MAGNETIC RECORDING OF TELEVISION SIGNALS

Filed July 23, 1951 12 Sheets-Sheet 1

INVENTOR
Wilfred W. Wetzel

BY Carpenter, Abbott, Coulter & Kinney
ATTORNEYS

MAGNETIC RECORDING OF TELEVISION SIGNALS

Filed July 23, 1951

INVENTOR
Wilfred W. Wetzel
BY Carpenter Abbott Coulter & Kinney
ATTORNEYS

MAGNETIC RECORDING OF TELEVISION SIGNALS

Filed July 23, 1951

INVENTOR
Wilfred W. Wetzel
BY Carpenter Abbott Coulter & Kinney
ATTORNEYS

INVENTOR
Wilfred W. Wetzel
BY Carpenter Abbott Coulter & Kinney
ATTORNEYS

Oct. 6, 1959 W. W. WETZEL 2,907,818

MAGNETIC RECORDING OF TELEVISION SIGNALS

Filed July 23, 1951 12 Sheets-Sheet 5

INVENTOR
Wilfred W. Wetzel
BY Carpenter, Abbott, Coulter & Kinney
ATTORNEYS

Oct. 6, 1959 W. W. WETZEL 2,907,818

MAGNETIC RECORDING OF TELEVISION SIGNALS

Filed July 23, 1951 12 Sheets-Sheet 6

INVENTOR
Wilfred W. Wetzel

BY Carpenter, Abbott, Coulter & Kinney
ATTORNEYS

INVENTOR
Wilfred W. Wetzel

BY Carpenter Abbott Coulter & Kinney
ATTORNEYS

INVENTOR
Wilfred W. Wetzel
BY Carpenter Abbott Coulter & Kinney
ATTORNEYS

INVENTOR
Wilfred W. Wetzel
BY Carpenter Abbott Coulter & Kinney
ATTORNEYS

INVENTOR
Wilfred W. Wetzel
BY Carpenter, Abbott, Coulter & Kinney
ATTORNEYS

INVENTOR
Wilfred W. Wetzel
BY Carpenter Abbott Coulter & Kinney
ATTORNEYS

Oct. 6, 1959 W. W. WETZEL 2,907,818

MAGNETIC RECORDING OF TELEVISION SIGNALS

Filed July 23, 1951 12 Sheets-Sheet 12

INVENTOR
Wilfred W. Wetzel

BY Carpenter Abbott Coulter & Kinney
ATTORNEYS

United States Patent Office 2,907,818

Patented Oct. 6, 1959

2,907,818

MAGNETIC RECORDING OF TELEVISION SIGNALS

Wilfred W. Wetzel, St. Paul, Minn., assignor to Minnesota Mining & Manufacturing Company, St. Paul, Minn., a corporation of Delaware Application July 23, 1951, Serial No. 238,035

26 Claims. (Cl. 178—6.6)

Figure 1:
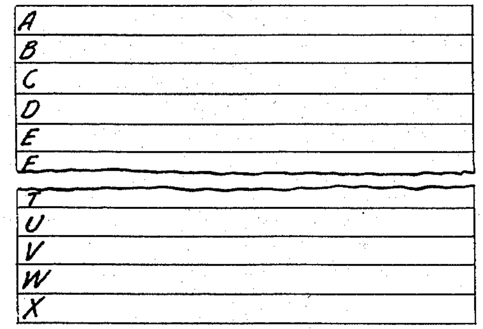

This invention relates to magnetic recording and reproduction of television, radar, telemeter and similar broad band signals.

In the present state of the art, black and white television signals occupy a frequency band ranging from 60 cycles to from 2–4 megacycles per second. It is generally considered, in the light of the present knowledge of magnetic recording, both infeasible and uneconomical to record magnetically such a broad band of frequencies; for example, to record magnetically even a considerable portion of the frequency band mentioned would require moving the record member past the recording and reproducing heads at speeds of several thousand inches per second, and the quantity of the magnetic record member which would be required to so record even a program of a few minutes' duration would be utterly uneconomical and impractical from the standpoint of handling and storing the record member.

As is well known, the present method of transcribing television programs for subsequent rebroadcast or for broadcast at stations that are not linked to the point of origin, involves displaying the images to be recorded upon the face of a kinescope, transferring the signal to a phosphor image on a kinescope screen where it is photographed, transferring the image to a negative film, to a positive film, to a mosaic and then back to the video wave form. Thus there are many electrical, chemical and optical processes involved and at each step of such processes there is some degradation in the quality of the image.

A principal object of our invention, therefore, is the provision of a method of recording television and similar signals to produce higher quality reproduction than is obtainable with motion picture methods of recording such signals. Particular advantages of our method, when embodied in magnetic recording, over motion picture methods are that the processing costs of photographic film are eliminated and the magnetic record is available for immediate reproduction without further processing. Furthermore, the magnetic record member may be erased and re-recorded many times while photographic film can be used only once. The magnetic record deteriorates at a much slower rate upon repeated playback than does photographic film.

A further important object of our invention is the provision of a method of recording television and similar signals in which the speed of the magnetic record member past the transducing heads is within limits which are feasible in accordance with present magnetic recording principles and in which magnetic record members are employed in quantities which are economical and feasible from the standpoint of handling and storing the record members. A further object of the invention is to provide a system of recording and reproducing complete television signals, including the video, synchronizing, blanking and equalizing signals, preferably by magnetic means, in apparatus which will reproduce accurately television and similar signals of the character described; and in such manner that the signals may be immediately reproduced or edited or erased. Other objects and advantages of our invention will become apparent as the description of the invention progresses.

In a preferred manifestation, our invention involves the division of television and similar signals, occupying a frequency band which may range from 60 cycles to from 2–4 megacycles per second, into several relatively low and narrow frequency bands. This division of the signals may be accomplished by providing the pick-up tube of the television camera with several scanning beams. Each beam covers an assigned fraction of the mosaic at a fraction of the line rate required for a single beam to scan the complete target. This method of scanning produces a plurality of frequency bands, whose maximum frequency is reduced from the standard, single band maximum frequency by a factor approximately equal to the number of the scanning beams.

The plurality of restricted frequency bands may then be magnetically recorded simultaneously on separate tracks on an elongated, magnetic record member. It will be apparent to those skilled in the art that the separate frequency bands may likewise be recorded mechanically or photographically; such methods are contemplated and the changes involved in adapting the invention to such recording methods will be readily apparent to such persons. Magnetic recording methods are preferred, in view of the fact that the magnetic record member may be readily erased and reused, and the invention will be described in such terms. The record member may be commercially available sound recording tape such as is now used in high-grade magnetic recording, but it is preferably several times wider than the standard quarter-inch width tape. Such sound recording tape comprises a paper or film backing coated with magnetic iron oxide particles or alloy particles; for example, No. 111 sound recording tape made and sold by the Minnesota Mining & Manufacturing Company under the brand name "Scotch," is particularly suitable. It has a cellulose acetate backing and a coating of ferric oxide particles, and has a coercive force of approximately 260 oersteds. It will be apparent that other types of magnetic record members may also be employed, for example a flexible, cold-worked, austenitic stainless steel band.

Usually the recordings will be made at the point of origin of the television program to be recorded, but for monitoring, time delay broadcasting, or other purposes it may be desirable to make the recording at some other point of the television system, as is pointed out in detail in connection with a modified form of the invention.

In the reproducing step, the signals from the several recorded tracks are used to control an identical number of cathode ray beams in a kinescope or similar tube. Each beam sweeps over an assigned fraction of the screen to reproduce the complete picture. The several kinescope beams travel at a line rate less than that of a single-beam, television tube by a factor approximately equal to the number of the cathode ray beams.

The reproduced image on the kinescope may be viewed directly by an observer or it may be televised through a camera and used for broadcast purposes. Through the use of a suitable kinescope called a "projection tube," the image may be projected upon a motion picture screen where it may be observed by a large audience.

In the description of our invention, we shall refer to the term "signal channel." By a signal channel, we mean to include such equipment as the scanning beam and the signal plate in the camera tube, the amplifiers and recording head in the recorder, the magnetic track on the record member, the playback head, playback amplifier and the sweep beam of the kinescope. In other words, the term "signal channel" includes equipment necessary to record and/or reproduce a single restricted band of frequencies.

While it is within the scope of our invention to utilize any number of signal channels greater than one, we prefer to use a system employing from four to fifty channels, when recording signals of the band-width of television signals. Signals of 300,000 c.p.s. band-width may be recorded, in accordance with our method, on two signal channels. In describing a preferred embodiment of our invention, we describe it in terms of utilizing twenty-four signal channels. This, as will be seen as the description proceeds, permits magnetic recording of television signals at tape speeds and at frequencies which may be recorded with presently known techniques. With the contemplated improvement of certain electronic equipment a system employing four or five signal channels could record the television signal band at feasible tape speeds.

As will be seen as our description advances, certain portions of each signal channel such as amplifiers, for example, must be supplied as independent units. Each additional signal channel in the recording and reproducing system therefore requires additional equipment. Accordingly we prefer to utilize the minimum number of channels consistent with known recording techniques. Devices for recording with 100 or more signal channels become impractical because of the very bulk and cost of the component parts required to construct such devices.

In the following description, a preferred embodiment of the invention is described in terms of arbitrarily dividing the camera mosaic and the kinescope screen into twenty-four equal horizontal strips, although other methods of subdivision and a different number of strips are equally feasible. By utilizing twenty-four equal horizontal strips, mis-matching of scanning lines through imperfect blanking can occur at only twenty-three points of our picture, whereas the choice of twenty-four vertical strips for scanning would allow imperfect blanking to be visible at about 11,000 points of the picture. It should be understood, however, that by the description of a particular method of target and screen subdivision suited to the system we are describing, other forms of subdivision of mosaic and screen suitable to other feasible systems are not excluded from the scope of our invention.

A modified form of our invention includes the use of electrostatic storage or memory tubes. Such tubes, when built with a number of electron guns equal to the predetermined number of signal channels, may be used both to convert the single channel, standard television signal from standard cameras into a multiplicity of lower frequency channels for purposes of recording and also to recombine the recorded signals from the plurality of channels into a standard television signal.

The principle involved in storage tubes is to produce on the target through such phenomena as secondary emission or bombardment conduction, a pattern of charges representing the picture in the same manner as the phenomena of photoelectric emission produces a pattern of charges on the target of a camera tube. This pattern of charges is then scanned in the storage tube and a television signal recovered. The electron beam which lays down the charge pattern is called a "writing" beam while that which scans the pattern and produces the signal is called a "reading" beam.

Suitably constructed, standard, storage tubes may be employed, for example, to convert a standard television signal into the multiple channel, relatively low-frequency recording of a picture signal. Each tube is provided with a writing beam for each recorded channel and a reading beam, or the same beam may be used for both functions. The picture is written into the targets by the several, relatively fast-moving writing beams of the several tubes and is later recovered by the reading beams moving at a substantially lower rate than a standard television scan.

The output of each tube during the slow scans will consist of a frequency band of a reduced width, which may be recorded separately by standard recording techniques.

The signal recovery process on playback is essentially the reverse of the recording system employing storage tubes to transform several relatively low-frequency bands into a standard television signal.

Figure 2:
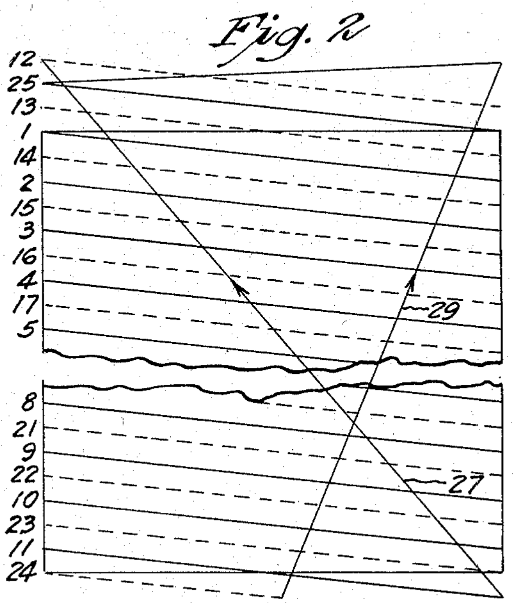
Figure 3:
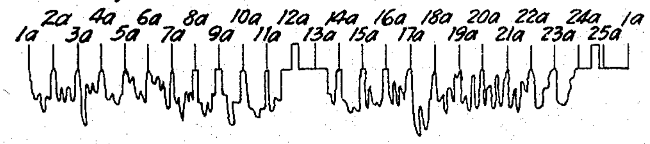
Figure 4:
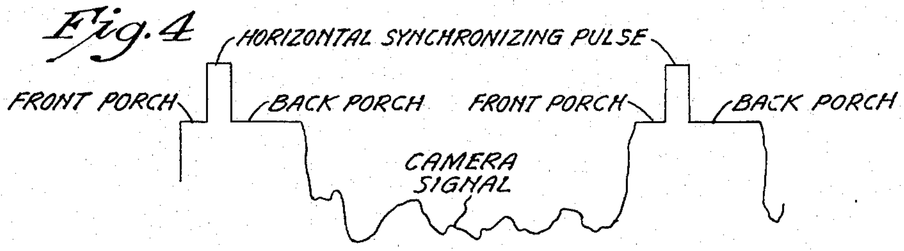
Figure 5:
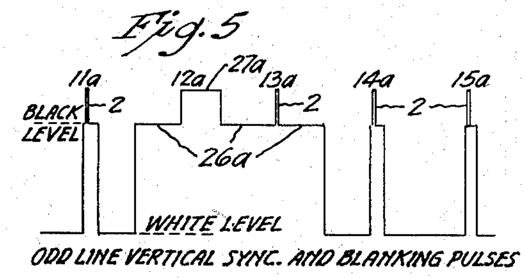
Figure 5A:
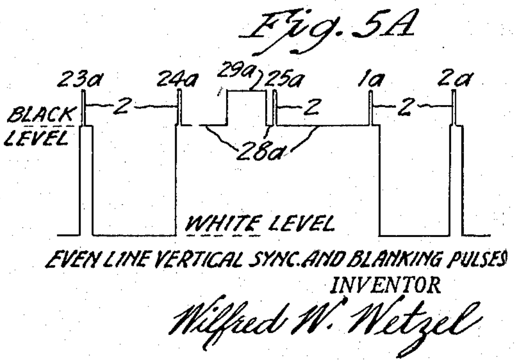
Figures 6, 7, 8:
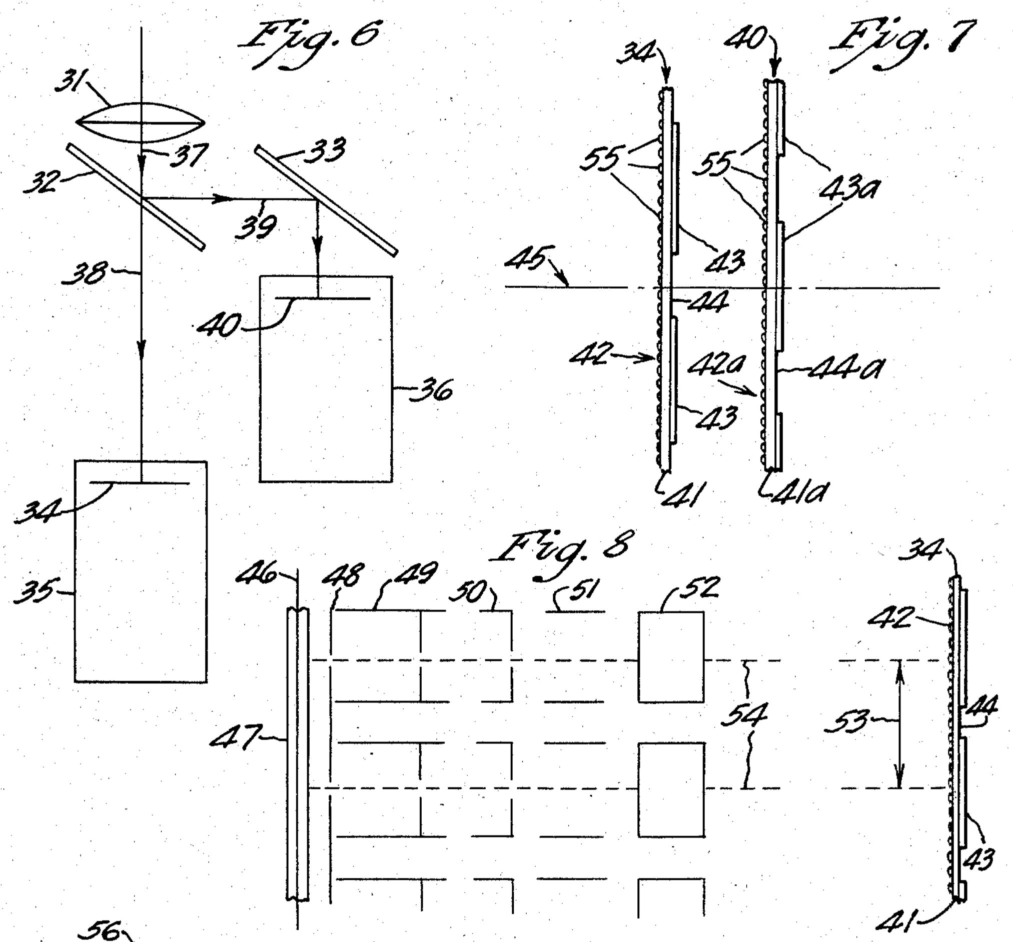

The invention will be readily understood from the following detailed description of certain preferred embodiments thereof, in conjunction with the accompanying drawings, in which:

Fig. 1 is a broken diagrammatic view (not to scale) of a preferred division of the picture area into 24 equal horizontal rectangles;

Fig. 2, a broken diagrammatic view (not to scale) of our preferred scanning pattern for interlaced scanning of each of the rectangular areas of Fig. 1;

Fig. 3, a diagrammatic view of the pattern of the signal, synchronizing and blanking pulses employed in controlling our method of scanning;

Fig. 4, a diagrammatic view of our horizontal blanking and synchronizing pulses together with the camera signal;

Fig. 5, a diagrammatic view showing the pattern of our odd-line vertical blanking and synchronizing pulses;

Fig. 5A, a diagrammatic view showing the pattern of our even-line, vertical blanking and synchronizing pulses;

Fig. 6, a diagrammatic sketch indicating the relative positioning of the camera lens, mirrors and camera tubes;

Fig. 7, a vertical diagrammatic view of the targets in the two camera tubes (not to scale);

Fig. 8, a partial, vertical, diagrammatic sketch of two, and a portion of a third, electron guns.

Figure 9:
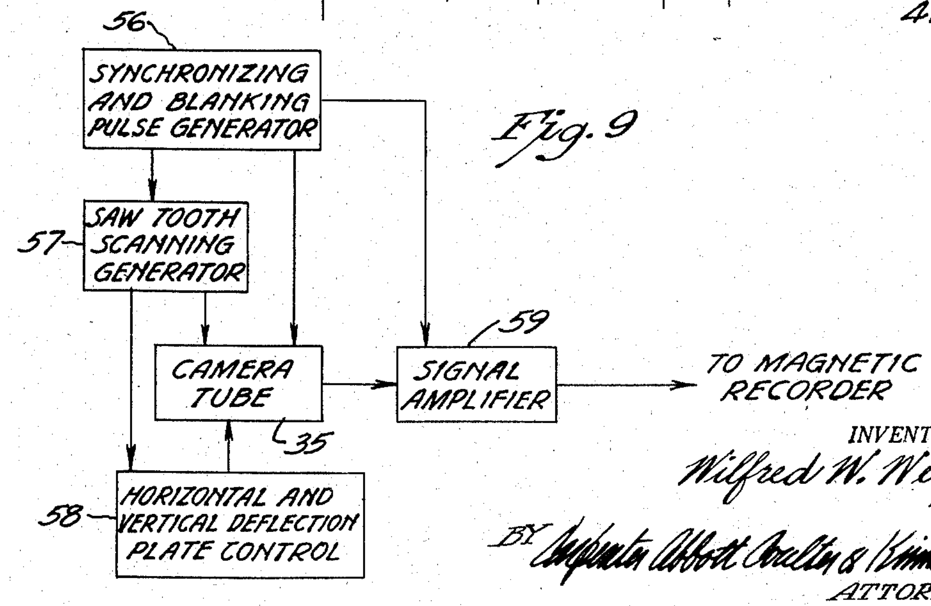

Fig. 9, a simplified block diagram of one of the signal channels leading to the magnetic recorder.

Figures 10, 11:
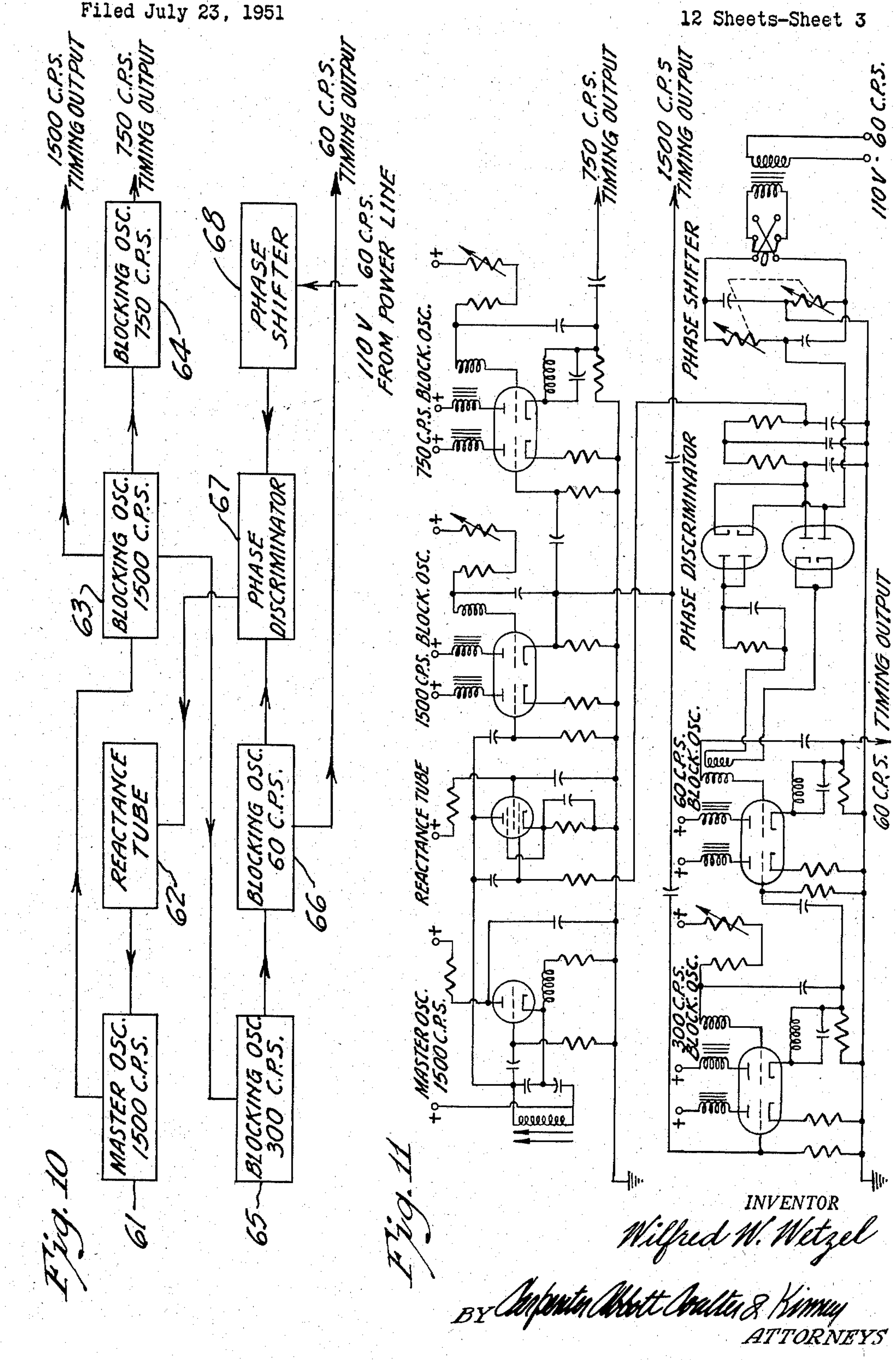

Fig. 10, a block diagram of the components of the timing unit of our synchronizing and blanking pulse generator.

Fig. 11, a schematic diagram, showing in greater detail, the apparatus of Fig. 10.

Figure 12:
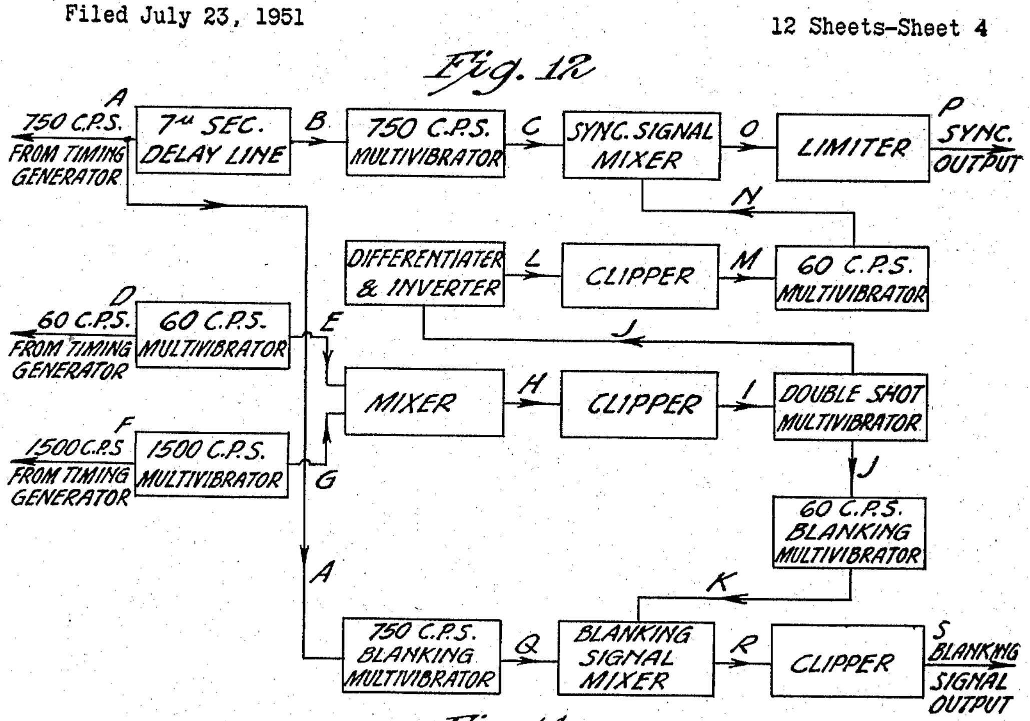

Fig. 12, a block diagram of the components of the mixing and shaping unit of our synchronizing and blanking pulse generator.

Figure 13:
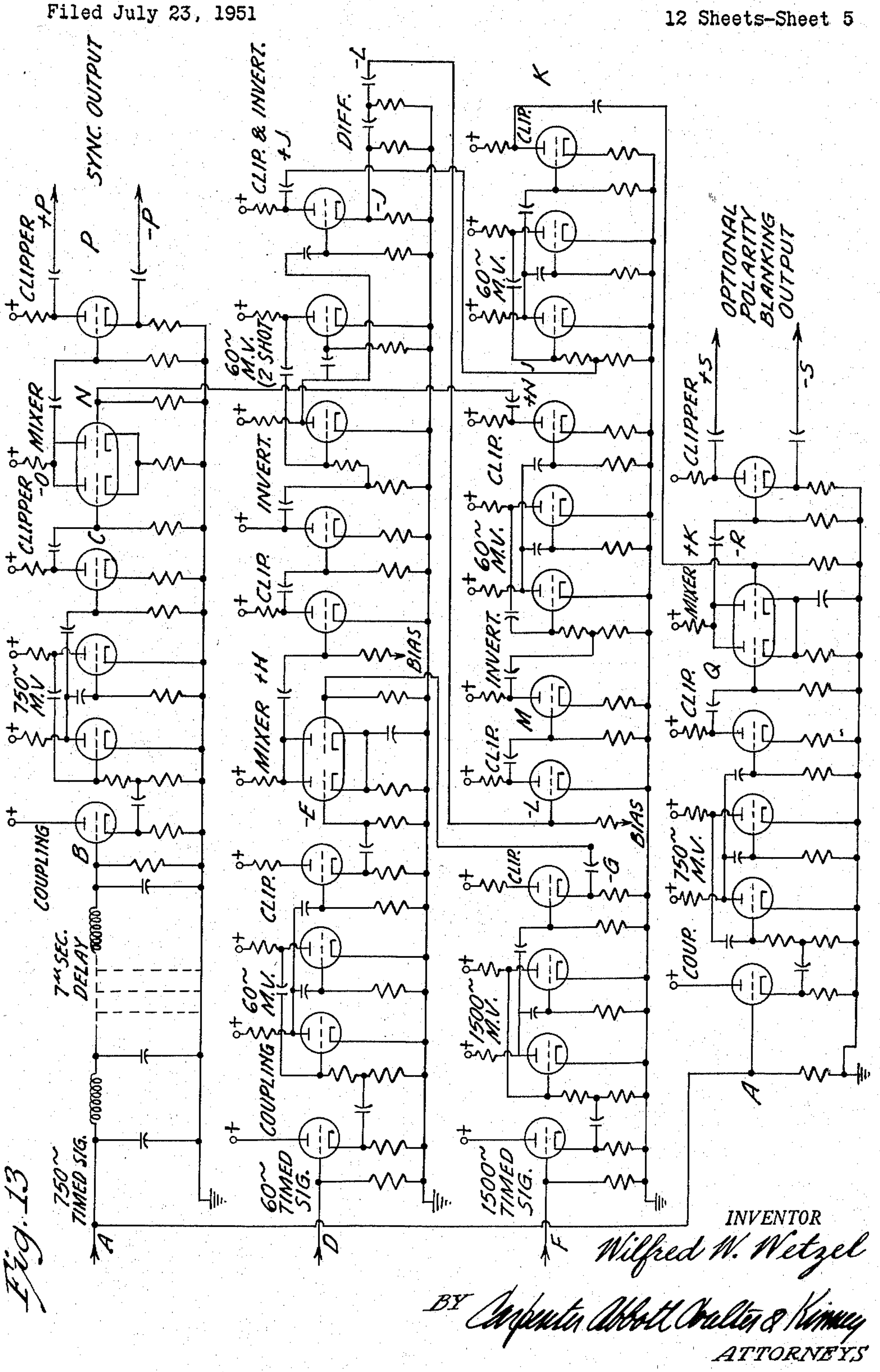

Fig. 13, a schematic diagram, showing in greater detail, the apparatus of Fig. 12.

Figure 14:
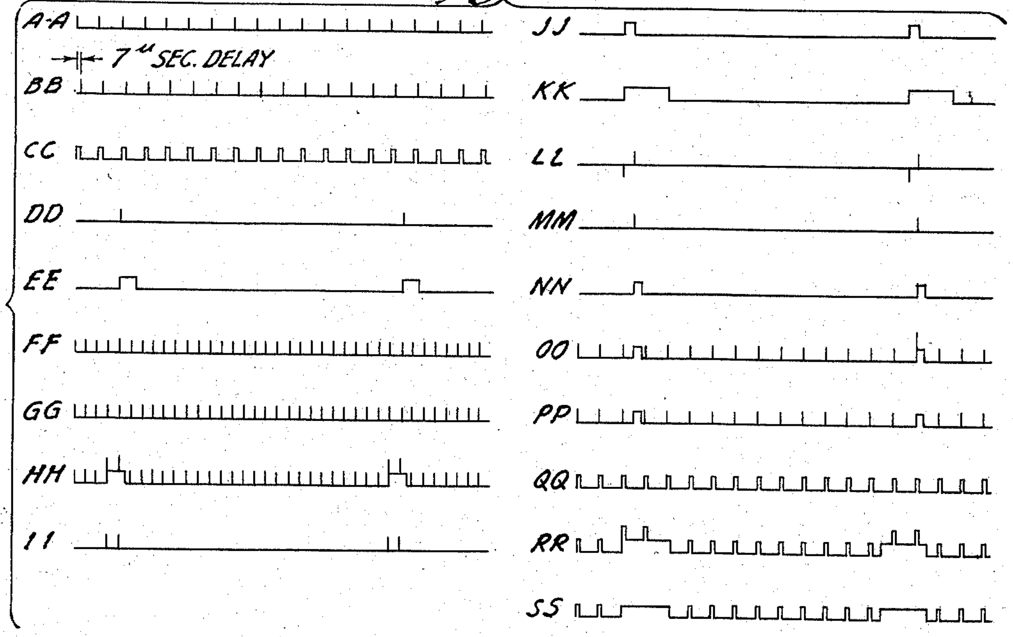

Fig. 14, a diagram, somewhat idealized, of the wave forms of our shaping and mixing unit.

Figure 15:
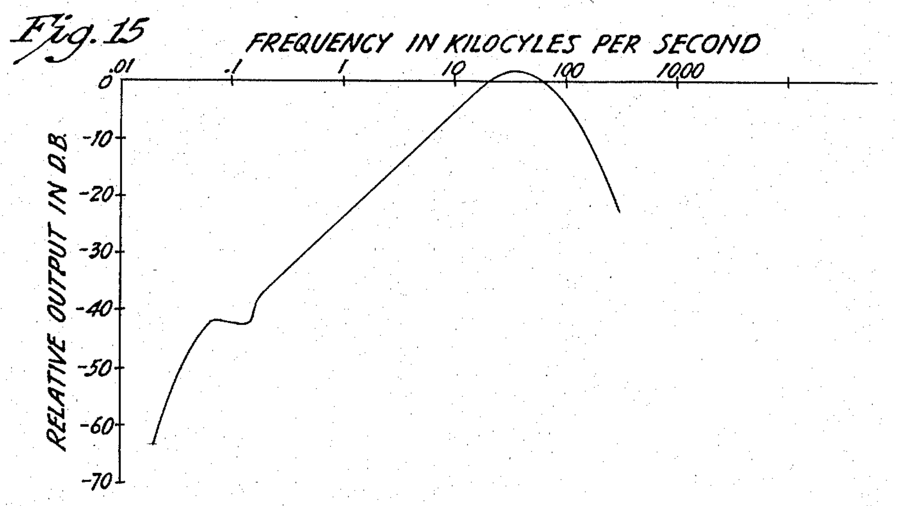

Fig. 15, a chart showing the constant current characteristics of a standard magnetic tape and using a professional recording head in which the tape speed was 150" per second.

Figure 16:
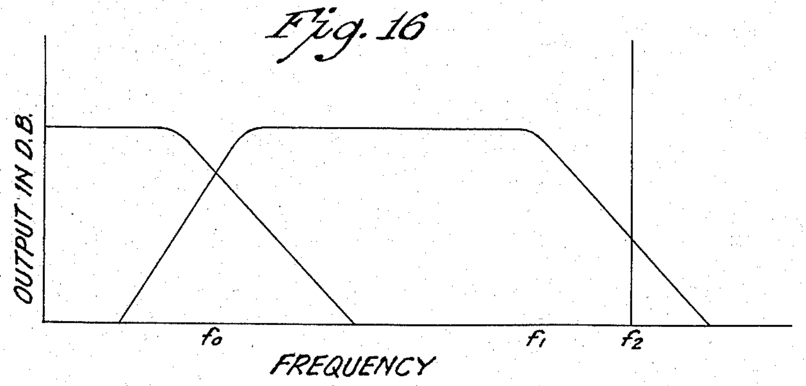

Fig. 16, a diagrammatic sketch of the pass characteristics of our filter system employed to separate the 175 kc. frequency bands of our camera signal into two bands of frequencies.

Figure 17:
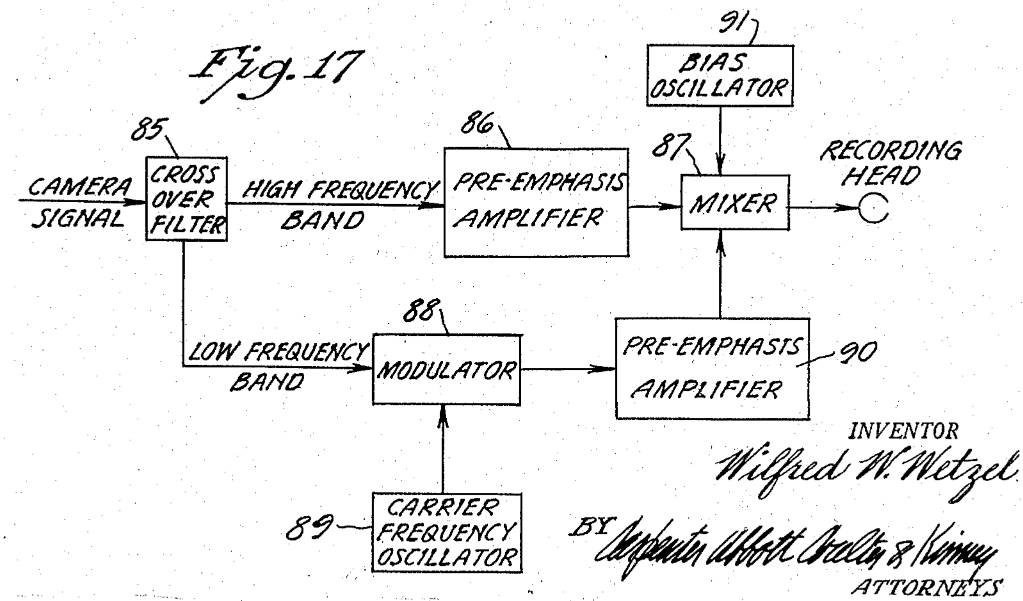

Fig. 17, a block wiring diagram of one signal channel of our magnetic recording circuit.

Figure 18:
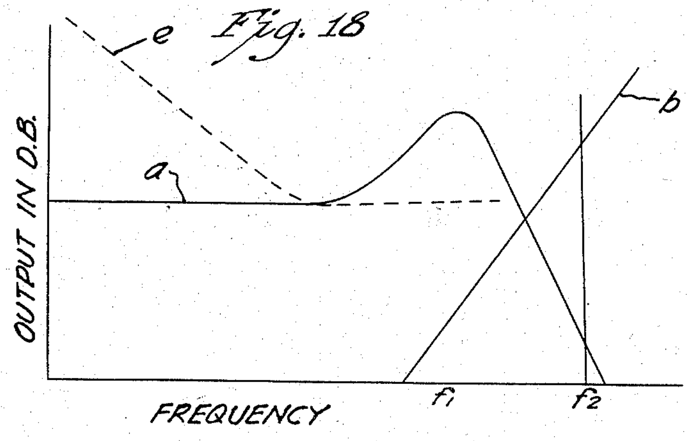

Fig. 18, curves showing the pre-emphasis added to compensate for the fall in constant current frequency response as shown in Fig. 15.

Figure 19:
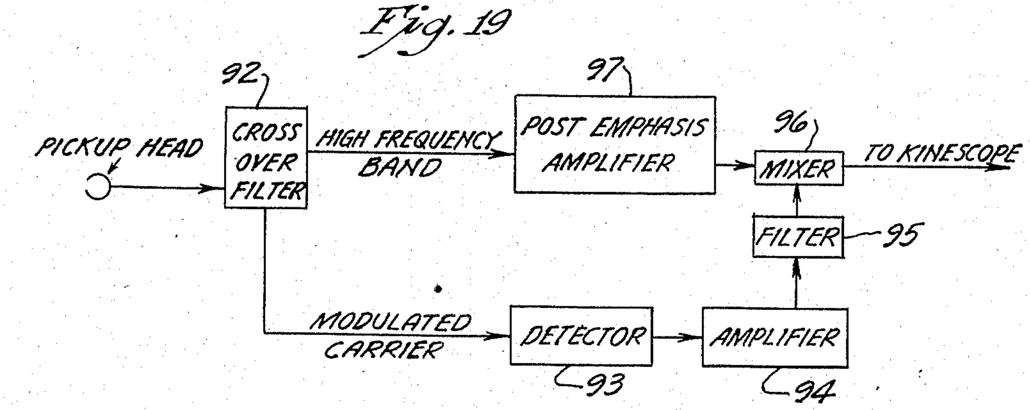

Fig. 19, a block circuit diagram of our playback system.

Figure 20:
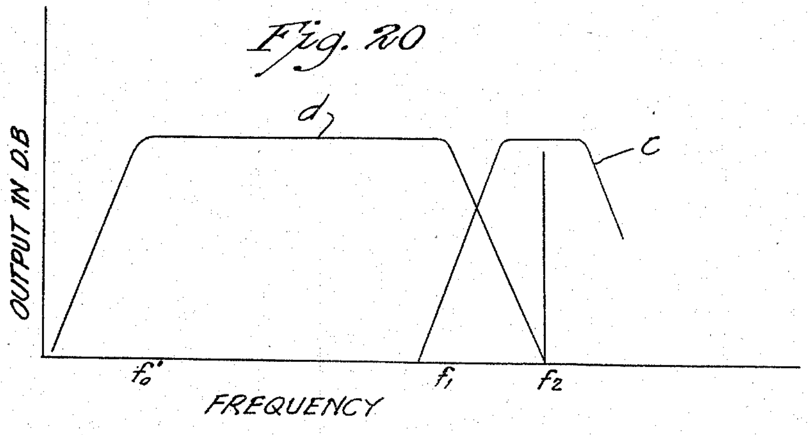

Fig. 20, curves showing the transmission properties of our cross-over filter.

Figure 21:
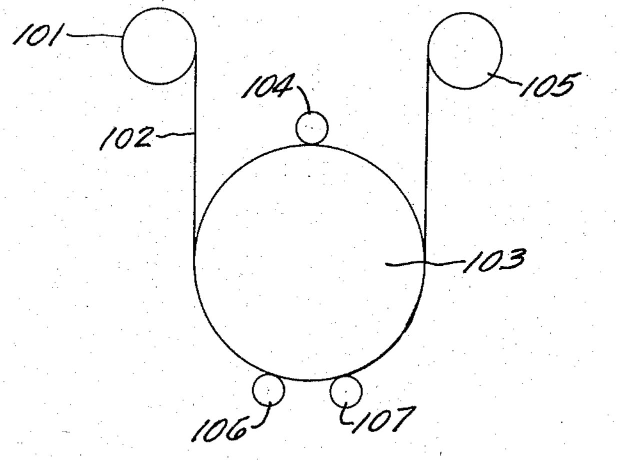

Fig. 21, a plan view, largely schematic, of the magnetic tape transport mechanism of our recording equipment.

Figure 22:
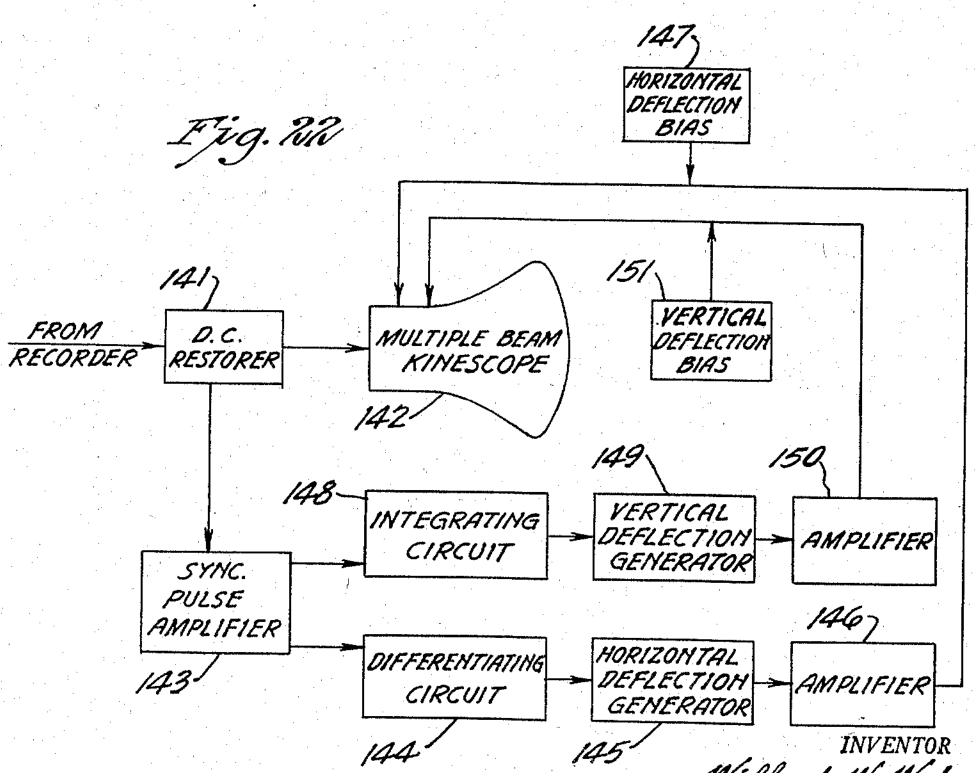

Fig. 22, a block diagram of one signal channel of our kinescope circuit.

Figure 23:
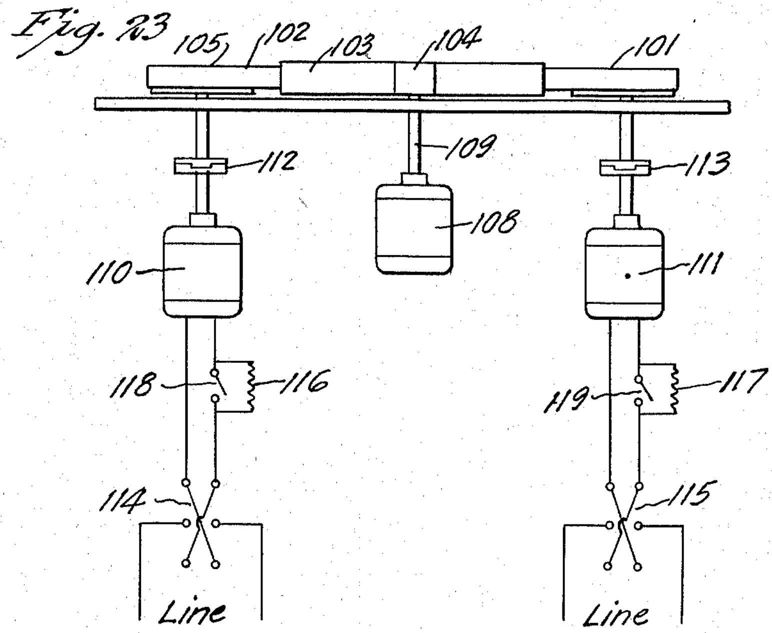

Fig. 23, a schematic elevational view of the tape transport mechanism shown in Fig. 21.

Figs. 24*a–e*, side elevational views of the components of a preferred transducer head.

Figure 25:
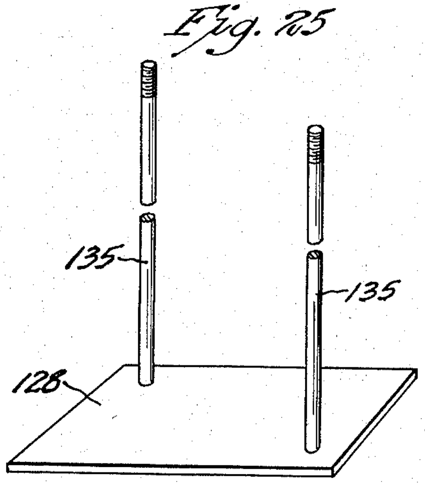

Fig. 25, a perspective view of an assembly stand for the transducer heads and shielding plates.

Figure 26:
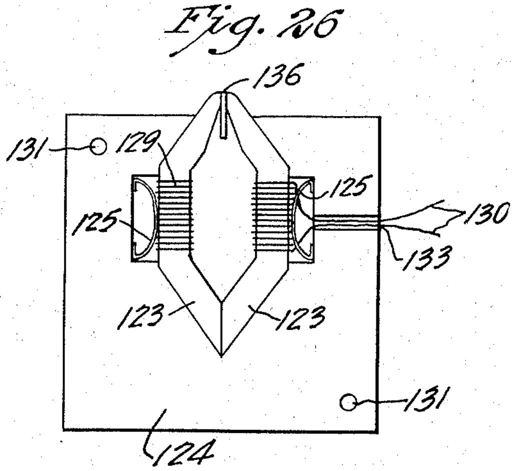

Fig. 26, a side elevational view of a partially assembled recording head on its supporting block.

Figure 27:
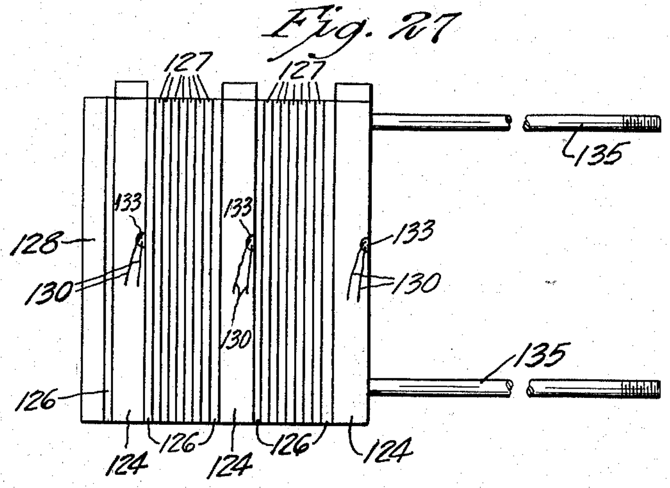

Fig. 27, a side elevational view of a plurality of transducer heads and shielding plates mounted upon the assembly stand.

Figure 28:
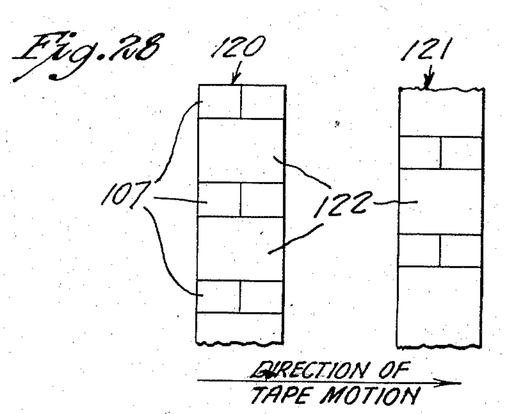

Fig. 28, a diagrammatic sketch of the disposition of the transducer heads in two banks.

Figure 29:
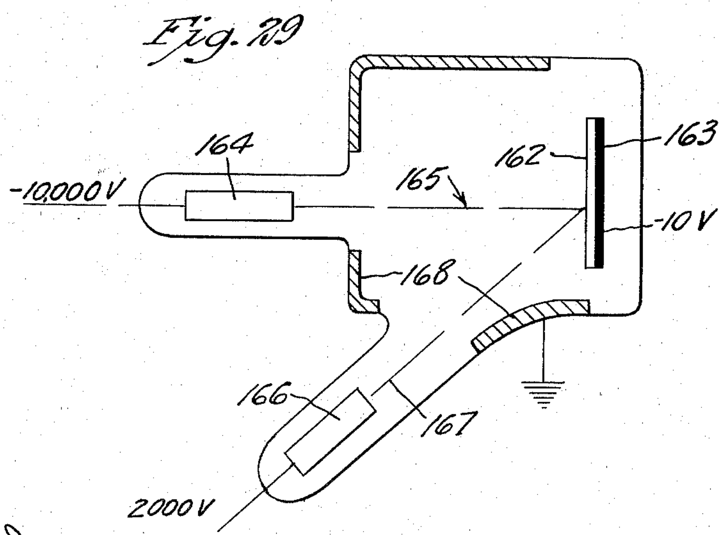

Fig. 29, a diagrammatic view of a storage tube operating on bombardment conduction.

Figure 30:
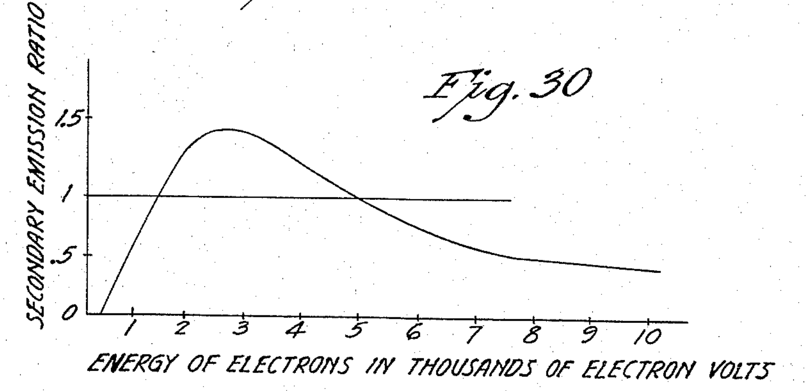

Fig. 30, a curve showing secondary electron emission from an insulating surface of the storage tube.

Figure 31:
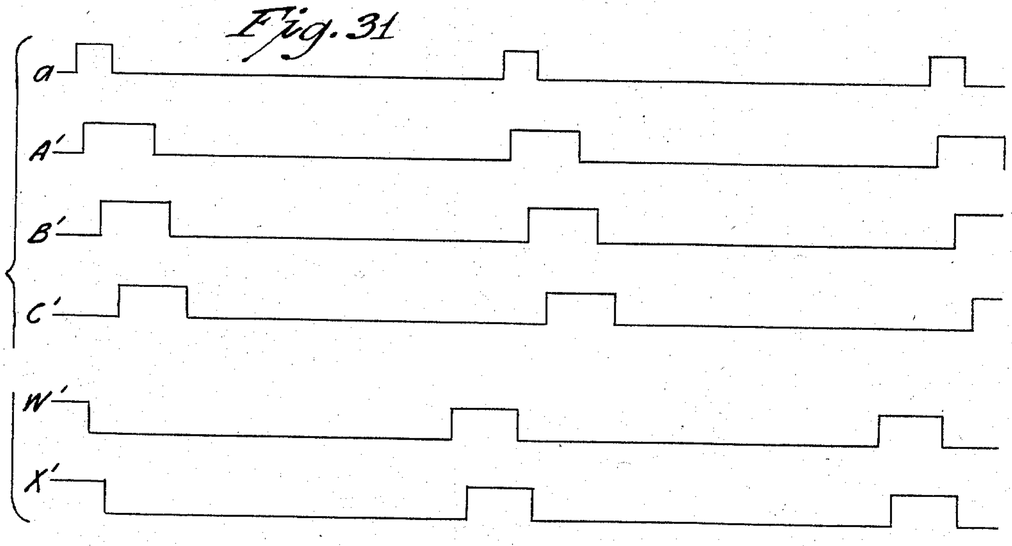

Fig. 31, a diagrammatic view (substantially to scale) of standard synchronizing pulses and of the vertical blanking pulses used in the embodiment of the invention employing several storage tubes.

Figure 32:
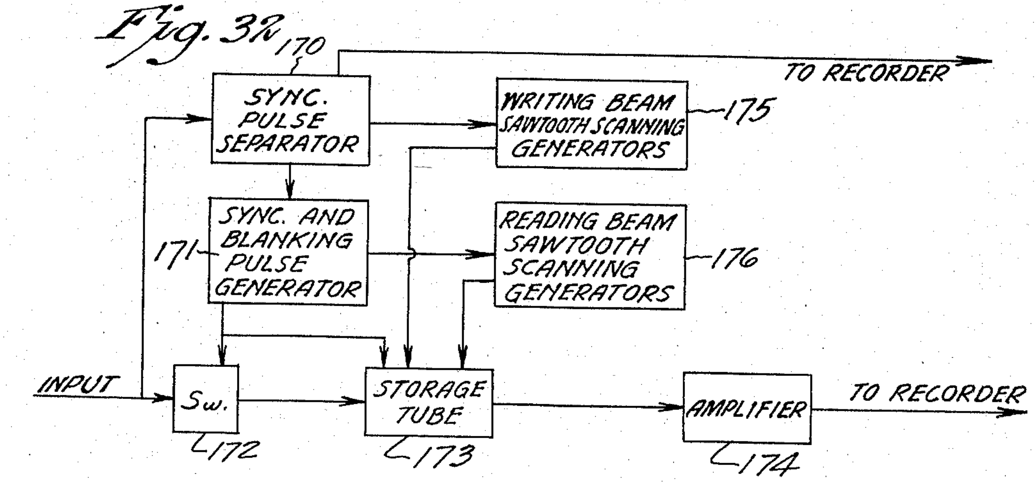

Fig. 32, a block diagram of the arrangement of the components for obtaining the synchronizing pulses and one channel of the video signal for recording, in the embodiment employing several storage tubes.

Figure 33:
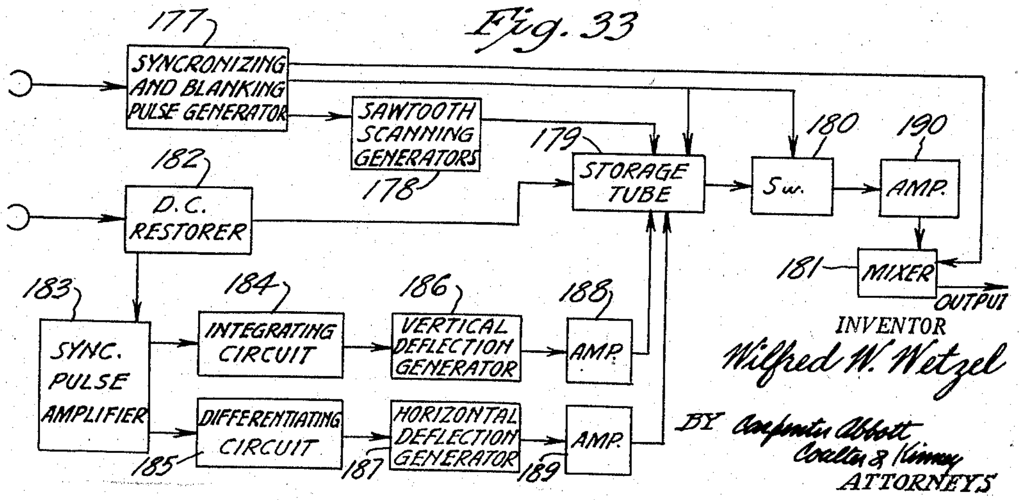

Fig. 33, a block diagram of the circuits employed in reproducing the several relatively low frequency video signals from the several magnetic tracks in the embodiment having several storage tubes.

Referring to the drawings, our preferred method of dividing the camera mosaic and the kinescope screen into a plurality of equal horizontal strips is shown in Fig. 1, in which the picture area is divided into twenty-four equal horizontal rectangles A–X. The scanning method which we prefer to employ to cover each strip A, B, C, etc. of mosaic in our camera tubes and each strip A, B, C, etc., of the phosphor screen in the kinescope tube is shown in Fig. 2. This scanning system is known as a 25-line, odd-line interlaced pattern. The even-line field comprises lines 1–11, shown in Fig. 2 as solid lines; the odd-line field, lines 12–24, are shown as dashes. Of the twenty-five available lines, as shown in Fig. 2, twenty-one lines are concerned with the picture signals and four lines, which are blanked out, are devoted to vertical retrace.

The time allocation in our preferred system is as follows:

Time for one field=16,667 micro-seconds
Time for one frame=33,333 micro-seconds
Time for one line=1,333 micro-seconds
Front porch, shown in Fig. 4=7 micro-seconds
Duration of horizontal synchronizing pulse, shown in Fig. 4=10 micro-seconds
Back porch, shown in Fig. 4=95 micro-seconds
Time for one line of camera signal shown in Fig. 4=1221 micro-seconds
Vertical synchronizing block, shown as **27*a* in Fig. 5=500 micro-seconds The scanning action of our preferred system begins with the horizontal synchronizing pulse 1*a* of Fig. 3, which actuates the horizontal sweep oscillator and causes line 1 of Fig. 2 to be traced. Pulse 2*a* of Fig. 3 causes line 2 of Fig. 2 to be traced. This sequence is continued up to pulse 11*a* of Fig. 3 and line 11 of Fig. 2. At the midpoint in time between pulses 11*a* and 12*a*, whose leading edges are 1,333 micro-seconds apart, a vertical blanking pulse 26*a* of Fig. 5 is introduced to terminate the camera signal. Line 11 of Fig. 2 is completed, as shown, before the arrival of the vertical synchronizing pulse 27*a* of Fig. 5 triggers the vertical sweep oscillator and causes the trace 27 to return to the top of the picture where line 12 of Fig. 2 is traced. The vertical blanking pulse 26*a* is continued until the mid-point of line 13 where it is removed and the picture signal is allowed to be present. The trace continues in the usual manner up to the beginning of line 24 when a second vertical blanking pulse 28*a* is introduced to obliterate the camera signal, as shown in Fig. 5A. Line 24 of Fig. 2 is half-traced before the arrival of the second vertical synchronizing pulse 29*a* of Fig. 5A causes the trace 29 to move to the upper part of the picture to scan line 25. Upon completion of line 25 the vertical blanking pulse is removed, the scanning cycle is completed and the next scan begins again with line 1** of Fig. 2.

In the multiple-channel picture-recording system of our invention each of the twenty-four rectangles A–X of our picture area is scanned in the camera tube by separate beams using our system of 25-line interlaced scanning. As previously mentioned, each line of scanning in our system allots 1,221 micro-seconds to the picture signal as compared with about 53.5 micro-seconds for a line of picture signal on the standard television system currently employed in the United States. The ratio of these two periods of time is nearly 23 to 1, which means that the scanning beam in our preferred system as described, passes over the picture elements with about 1/23 the standard frequency and, therefore, requires an upper frequency limit of only about 1/23 that of present television practice to transmit and record the picture signal.

While special camera tubes, a special recorder and a special kinescope are required in order to generate, record and reproduce picture signals in accordance with a preferred embodiment of our invention, the component parts of our system are generally known to those versed in the engineering practices commonly employed in the magnetic recording and television arts. Our invention, comprising lowering the high-frequency limits now required to transmit picture information, preferably embodies the use of multiple scanning beams in signal generating tubes and the use of multiple-beam tubes to receive and assemble the picture. Many variations of the application of our invention will occur to such engineers from the system herein described, and it is to be understood that by describing a particular system embodying our invention we do not wish to be limited to that system.

The television camera, we prefer to use in one embodiment of our invention, is one in which two camera tubes are employed. Referring to Fig. 1, we prefer to assign the twelve alternate strips A, C, E, etc., of the picture to one tube, and the other twelve strips B, D, F, etc. to a second tube. Each tube is provided with twelve scanning beams, and each beam is disposed to scan one of the twenty-four image areas A–X.

In Fig. 6 is shown diagrammatically the arrangement of the camera lens 31, a half-silvered mirror 32, a fully-silvered mirror 33 and the camera tubes 35 and 36. Light rays 37 from lens 31 are split into two beams 38 and 39; beam 38 travels directly ahead to the target 34 of tube 35 and the other beam 39 is directed to mirror 33 which reflects the light to target 40 of tube 36.

The vertical position of the targets 34 and 40 in tubes 35 and 36, respectively, is shown in Fig. 7.

In targets 34 and 40, reference characters 41 and **41*a* indicate thin sheets of mica which serve to support the mosaic 42 and 42*a* and the signal plates 43 and 43*a*. The signal plates consist of translucent conductors such as half-silvered surfaces in the form of horizontal strips that are insulated from adjacent strips by spaces 44 and 44*a* of uncoated mica. The mosaic consists of many isolated globules 55 of photosensitized silver separated from one another by uncoated mica. In this embodiment of our system, the targets 34 and 40 have an active picture area that is 2.5″ in height. The signal plates 43 and 43*a* are approximately 0.12″ in height and are separated by uncoated strips 44 and 44*a* that are approximately 0.08″ in height. The signal plates are approximately 3.5″ in length. Reference line 45 indicates the relative positioning of the signal plates in the camera tubes, i.e., the signal plates 43 in tube 35 are centered upon the uncoated surface strips 44*a* of tube 36**.

Conventional micrometer adjustments are provided for mirrors 32 and 33 of Fig. 6, to align the divided light beams 38 and 39 upon targets 34 and 40. Micrometer adjustments on tube 36 permit rotation of the tube about its long axis to permit the target strips to be brought into a horizontal position. Screw adjustments also permit tube 36 to be moved parallel to its long axis, to permit the divided beams 38 and 39 to be focused simultaneously on the two targets 34 and 40. Provision is also made for rotating tube 35 about its long axis to assure that the target strips of target 34 are precisely parallel to the target strips of the target 40. Small differences in vertical positioning of the two targets may be compensated by adjusting the mirror 33.

It is necessary that the scanned strips on the two tubes 35 and 36 be parallel and at the same time match with precision; for example, the bottom of the rectangular strip C of Fig. 1 on the target of one camera tube must match precisely with the top of strip D on the target of the other camera tube in order that scanned lines on the two tubes neither overlap nor are unduly separated. In the targets of the system described, where each scanned strip A, B, C, etc., is approximately 0.1″ in height, the scanning lines 1, 2, 3, etc., on each strip are separated approximately 0.0045″ from one another. In aligning the target strips in the two tubes an error of about 10% or 0.0005″ in the relative vertical positions of the scanning lines on the alternate strips A and B, etc., will not result in a displeasing picture when recorded and reproduced. The micrometer adjustments on the tubes 35 and 36 and on the mirror 33 are provided to enable us to bring the related picture strips on the separate targets 34 and 40 to within this permitted error of separation.

In the system described, twelve electron guns are built into each camera tube. A partial vertical section through two of our electron guns is shown in Fig. 8. The filament 46 heats the oxide-coated cathode 47. Electrons from the common cathode 47 are controlled by the common grid 48. The accelerators 49 are at a common potential and require only a single lead from the tube. The focusing electrodes 50 are at a common potential. Plates 51 and 52 are, respectively, the vertical and horizontal electrostatic deflection plates and deflect the individual beams 54 so that they strike the target strips on a vertical line and are separated vertically by a uniform distance, as shown by reference line 53. This distance in our tubes is approximately 0.2″, as measured at the target 34. Small inaccuracies in electron gun spacing and beam direction are corrected by the deflecting plates.

The camera tubes are preferably operated as orthicon-iconoscopes with a common axial focusing magnetic field and common horizontal magnetic deflection for the plurality of beams in each tube. The relatively small, vertical deflection, required to scan the 0.1″ strip of the target is provided by electrostatic deflection from plates 51, shown in Fig. 8. Other types of camera tube, such as a "Vidicon" made by Radio Corporation of America, may be employed.

Thus each of the twenty-four beams 54 simultaneously scans one of the rectangles A, B, C, etc. in the pattern shown in Fig. 2. The scanning is controlled by the customary electronic circuits, actuated by a pulse generator which produces the pulse patterns shown in Figs. 3, 4 and 5. The scanning simultaneously produces twenty-four separate camera signals on the twenty-four signal plates 43, **43*a*. The total of the twenty-four signals represents the complete image since the scanning is arranged to cover the complete image area. However, the highest frequency required from any one of the twenty-four signal plates is only approximately 1⁄23 of that required in the conventional television system, in which one scanning beam covers the entire image area and the signal is detected by a single signal plate. Since the twenty-four signal plates are electronically insulated one from the other by the bare mica strips 44, 44*a***, and since capacitative coupling between signal plates is minimized by their physical separation and the reduced frequencies generated by our system, each signal plate becomes a relatively independent and low-frequency signal generator for one channel of our recording system.

A simplified block diagram of one of the twenty-four signal channels, leading to the magnetic recorder, is shown in Fig. 9. The components thereof, except the synchronizing and blanking pulse generator 56, shown in Figs. 10–13, are commonly used in the television industry.

Synchronizing pulses from the generator 56 control the timing of the scanning generator 57, which, in turn, controls the current in the deflecting coils (not illustrated) of the camera tubes 35 and 36. The deflection plate control 58 permits the correction of the position of the scanning spot and, through the scanning generator 57, controls the motion of the scanning spot. Blanking pulses from the synchronizing and blanking pulse generator 56, shown in Figs. 10–13, are applied to the grid 48 of the electron gun to cut off the beam current during fly-back. A lead from each signal plate 43 goes to its signal amplifier 59. Synchronizing pulses from the pulse generator are added to the signal in the amplifier.

Each signal channel of our system requires individual deflection plate control 58 and a separate signal amplifier 59. The pulse generator 56 and scanning generator 57 are common to all channels.

The synchronizing and blanking pulse generator 56 that we prefer to employ is shown in Figs. 10–13 as divided into two units, a timing unit and a shaping and mixing unit. The timing unit, shown in Figs. 10 and 11, delivers accurately timed pulses to the shaping and mixing unit, shown in Figs. 12 and 13. The mixing and shaping unit shapes and mixes the timed pulses to provide our 25-line synchronizing and blanking pulses.

The timing unit of Figs. 10 and 11 derives its signals from a 1500-cycle sine wave master oscillator 61, whose frequency is closely controlled by a reactance tube 62. This oscillator's output is then used to trigger a 1500-cycle blocking oscillator 63. This blocking oscillator triggers two dividing, blocking oscillators; oscillator 64 divides by two to give 750-cycle pulses, and the other oscillator 65 divides by five to give 300-cycle pulses. The 300-cycle pulses trigger another dividing, blocking oscillator 66 which divides by five to give 60-cycle pulses. These 60-cycle pulses are fed to a phase discriminator 67 where their phase is compared to the phase of the 60-cycle power-line frequency, which is fed through the phase shifter 68. The output of discriminator 67 controls the 1500-cycle oscillator's reactance tube. This type of timing unit is suitable when recording live images with the multi-signal plate orthicon-iconoscope, previously described.

1,500-, 750- and 60-cycle pulses are taken from the timing unit and fed to the mixing and shaping unit. The structure and action of the shaping and mixing unit are shown in Figs. 12 and 13 and will be readily understood by those skilled in the television arts without detailed description of the unit. The wave forms at the various points in this unit are shown in Fig. 14.

Turning now to our multiple-track magnetic recorder, shown in Figs. 21 to 28, many of the details of its construction are not new and will be readily understood, by those versed in the art of magnetic and other types of phonographic recording, from the drawings and the following description. The selection of twenty-four signal channels, in describing a preferred embodiment of our invention, has the advantage of enabling the usage of recording heads and bias and signal frequencies which are in current recording use.

One rule of good practice in magnetic recording of sound on tape record members is that a maximum of between one thousand and fifteen hundred cycles of sinusoidal signal may be recorded on one longitudinal inch of tape track. In television broadcasting a maximum signal frequency of about 4 mc. is considered good practice. The minimum frequency of the current television band is 60 cycles.

In a preferred embodiment of our system we divide the 4 mc. maximum frequency into 24 channels each having a maximum frequency of 175 kc. and a minimum frequency of 60 cycles or less. Consistent with standard practice, we have selected a tape speed of 150 inches per second for our recorder. The speed of the magnetic record member will vary inversely with the number of signal channels to be recorded; for example, if a system employing 48–50 channels is used, the speed of the record member may be reduced to approximately 75 inches per second. Likewise, if the number of signal channels to be recorded is reduced to twelve channels, the tape must be driven much faster than 150″ per second.

A constant current characteristic curve for a standard United States magnetic tape and professional recording heads of good construction is shown in Fig. 15. The tape speed during the measurement was 150 inches per second.

It is usually standard practice in magnetic recording to pre-emphasize the high frequencies above the point of maximum response during recording and to post-emphasize the frequencies lower than the point of maximum response during playback. This is done in order to flatten the overall frequency response of the record and playback system. Pre-emphasis is accomplished without sacrifice of signal-to-noise ratio of the tape record member but post-emphasis raises the noise level of the tape as well as the level of the signal.

In order to record 60 cycles without disturbing phase shifts it is desirable to flatten the frequency response of the system to or below 6 cycles. By examining the curve of Fig. 15, it becomes evident that it would require more than 60 db of equalization to flatten the frequency response at 6 cycles. In this manner 6-cycle tape noise would be raised to near the 40 kc. signal level, which would result in recorded picture signals having strong undesirable random intensity modulation. To avoid the necessity for excessive post-emphasis and its consequent loss of signal-to-noise ratio we choose to divide each of our 175 kc. bands into two bands of frequencies. This is accomplished through filters having a crossover point at 2,000 cycles. Each frequency band becomes two bands, one essentially a 6 to 2000 cycle band and the other essentially a 2 to 175 kc. band. The lower band is recorded as frequency modulation of a 200 kc. carrier on the same track with the higher frequency band, which is recorded in the conventional manner using standardized equalization techniques.

The pass characteristics of our filter system, employed to separate the 175 kc. frequency bands of our camera signal into two bands of frequencies, is shown in Fig. 16. We choose the cross-over point $f_0$ to be at 2,000 cycles although it may vary considerably from this value without invalidating our principle. The rolloff point $f_1$ of the high frequency band is chosen as 175 kc. in order to include this value in the band. Our carrier frequency $f_2$, which is frequency modulated by the 6–2000 cycle band, is 200 kc.

Fig. 17 shows a block diagram of one channel of the magnetic recording circuit. The crossover filter 85 separates the camera signal into two bands of frequencies. The high frequency band is pre-emphasized and amplified in amplifier 86 and is then fed to a mixer circuit. The pre-emphasis curve for this band is shown as curve *a*, Fig 18, which is used to flatten the constant current frequency response curve of Fig. 15 between 40 and 175 kc. After pre-emphasis the high frequency band is fed into a mixer 87.

The low frequency band is fed into a modulator 88 where it is used to frequency modulate a 200 kc. frequency supplied by the carrier frequency oscillator 89. The carrier frequency and its side bands are led to a pre-emphasizer amplifier 90, which supplies pre-emphasis shown as curve *b*, Fig. 18, to compensate the recorded signal for the approximately 15 db per octave fall at 200 kc. in the constant current frequency response characteristic of Fig. 15. The pre-emphasized frequency modulated signal is fed to the mixer 87 where it is added to the pre-emphasized high-frequency band and to the bias frequency, from oscillator 91, which we choose to make 875 kc. or 5 times the highest video frequency in the 175 kc. band. The combined bands and bias are fed to the recording head. By adjusting amplifier 90 to feed the mixer at a relatively low level, the difference in frequencies, generated in the mixer between the 200 kc. carrier and the picture signal frequencies in the high frequency band, are minimized. Recording of the frequency modulated carrier at a relatively low level becomes possible for the reason that in our playback system, high frequency tape noise is suppressed and the signal-to-noise ratio of the carrier recording is not the governing factor in determining the signal-to-noise ratio of the reproduced signal. This will become evident as our description advances.

Passing over momentarily the construction and arrangement of the transducer heads in our recorder, a block diagram of our playback system is shown in Fig. 19. The signal from the pickup head is fed into a cross-over filter 92, whose transmission properties are illustrated in Fig. 20. The carrier frequency $f_2$, which we have chosen as 200 kc., together with its side bands, which extend from 190 to 210 kc., is passed by filter 92 having the characteristics of curve *c*, Fig. 20. The modulated carrier signal is fed to a detector 93 for demodulation, to an amplifier 94 for adjusting level and then to a low pass filter 95 with a high-frequency cutoff at about 6000 cycles, which suppresses high-frequency noise. From the filter 95 the signal is led to a mixer 96. Post-emphasis is not required since the response was flattened over the frequency range of this band through a relatively small amount of pre-emphasis.

The high-frequency band is separated from the composite signal of the pickup head by filter 92 having the pass characteristics shown as curve *d*, Fig. 20. Here $f_0^1$ is chosen as 1000 cycles in order to minimize filtering phase shifts at $f_0$ or 2000 cycles. It is desirable, however, to have a rolloff at $f_0^1$ in order to suppress low-frequency tape noise in this band. The signal passing this filter is fed into an equalizing amplifier 97 and then fed to the mixer 96 where it is combined with the low-frequency band. The equalization in amplifier 97 is shown as curve *e*, Fig. 18 and serves to flatten the response of the high-frequency band between 2 and 40 kc. The output of the mixer constitutes one channel of video signal and is available to operate one beam of the kinescope.

The advantages of our recording and reproducing system for minimizing noise in the reproduced signal are now evident. Through the use of a carrier frequency we have eliminated the need of post-equalization. This reduces the low-frequency noise considerably. Also, the band pass filter, whose characteristic curve is given as curve *c* in Fig. 20, suppresses low-frequency tape noise. The only noise from the tape entering the detector 93 is the high-frequency tape noise passed by the filter 92 lying within the range of about 180 to 220 kc. together with all frequencies of modulation noise. In magnetic recording modulation noise is defined as noise appearing only in the presence of a signal and whose level is approximately proportional to the signal level. Because of the nature of the detection or demodulation, this noise appears with the demodulated signal even though tape noise is suppressed by the demodulator. After amplification, the demodulated signal is passed through the second, or low pass filter 95, to remove modulation noise having frequencies above about 6000 cycles. In our system the signal-to-noise level is not determined by tape noise but by either modulation noise or electronic circuit noise, whichever is the greater. It is this factor which permits the simultaneous recording of the carrier frequency at a relatively low level, with a 2000 to 175,000 cycle band of frequencies at a standard level and therefore without generating beat frequencies in the band, which are of objectionable level.

In the embodiment of our video recording system employing twenty-four such recording and reproducing channels, the only circuit elements, which may be used in common in the twenty-four recording channels, are the bias oscillator 91 and the carrier frequency oscillator 89. We provide a 25th track on our magnetic tape record member for the recording of sound which may accompany the picture. The same considerations which require recording the low-frequency band of the video signal as frequency modulation on a 200 kc. signal, indicate the desirability of recording our audio signals, which cover the frequency range from 30 to 15,000 cycles, as frequency modulation on a carrier. A 150 kc. carrier may be used for our audio channel. The details of the audio recording and reproducing system will be evident to engineers in view of the preceding discussion of frequency modulation recording and therefore need not be repeated here.

As previously mentioned, our system of magnetic recording of television picture signals requires the recording of synchronizing and blanking pulses as well as the camera signal on each of the twenty-four tape tracks. These pulses are used to synchronize the individual sweep beams in a kinescope through the triggering of twenty-four separate horizontal and vertical saw tooth oscillators. Once the horizontal pulse from a tape track has initiated the sweep of one kinescope line, the tape member has no control over the travel of the light spot until the advent of the next synchronizing pulse. Accordingly good control over tape speed from one pulse to the next is required in order that the proper instant-to-instant correlation between picture signal and scanning spot position will be maintained. In conventional apparatus for driving tape record members, the eccentricity of guide rollers, irregular adhesion of tape to stock rolls, etc., gives rise to various modes of elastic vibration of the tape. Elastic vibration in an audio recorder gives rise to a frequency variation in the recorded tone known as flutter. In video recording, these elastic vibrations cause the picture signal to modulate the beam intensity in the kinescope at incorrect positions of the light spot and may produce jagged vertical lines in the complete picture which are annoying to the observer.

Accordingly, the transport mechanism of our video tape recorder is designed to eliminate elastic vibration of the tape record member in the neighborhood of the recording heads, to damp out tape speed variations due to eccentricities in the guide rollers and tape reels, and to reduce to acceptable amounts eccentricities of the drive capstan.

A preferred form of tape transport mechanism is diagrammatically shown in Figs. 21 and 23. It includes a supply reel 101 of magnetic recording tape 102 of the type described. A large diameter, drive capstan 103 is rim driven by an 1800 r.p.m. synchronous motor 108 through a rubber puck 104. The tape after it passes over the capstan is stored on the reel 105 which is also motor-driven. The tape passes in contact with a group of transducer heads 106 and a second group 107 of transducer heads at about the midpoint of its movement over the capstan. The transducer heads are arranged in banks, as hereinafter described, and may comprise conventional, professional-type magnetic recording heads such as are manufactured by Brush Development Co. of Cleveland or Ampex Corp. of San Carlos, California. The head gap may be about 0.001". The capstan 103 of our recording and reproducing machine may have a diameter of 24" and a rotational speed of 120 r.p.m. to provide a tape velocity of about 150 inches per second. The 1.6" diameter rubber puck 104 is mounted directly on the shaft 109 of synchronous motor 108 which serves to rim drive the capstan 103 at the required speed.

Reversible motors 110 and 111 supply power to the tape reels 105 and 101, respectively, through a pair of slipping clutches 112 and 113. The combination of clutches and reversible motors transports tape 102 from the supply reel 101 to the storage reel 105, maintains tension in the tape during the tape transfer and rewinds tape from the storage reel to the supply reel.

Switches 114 and 115 are employed for reversing the direction of revolution of the motors. Resistances 116 and 117 together with shunting switches 118 and 119 are inserted in the leads and the values of the resistances are so chosen as to reduce the power of the motor by a factor of about ten when the resistance is not shunted.

The greater part of the power needed to transport tape from reel 101 to reel 105 is supplied by the synchronous motor 108 through the rubber puck 104 and the capstan 103. Motors 110 and 111 supply only enough power to wind the tape 102 on the reels.

To transport tape during the recording process from reel 101 to reel 105, switch 114 is closed so that reel 105 rotates clockwise, as seen in Figure 21, and switch 118 is closed to allow motor 110 to develop full power. Switch 115 is closed in a manner which causes reel 101 to rotate clockwise as seen in Figure 21. Switch 119 is opened to reduce the power to motor 111 causing it to act as a brake and therefore maintaining tape 102 under the proper tension. The actual value of the braking force is limited by the slipping point of clutch 113. Similarly the torque on reel 105 is maintained constant through slippage of clutch 112. The speed of motor 110 is chosen with respect to the diameter of the storage reel so that when tape is initially fed to the reel at 150 inches per second and wound on a small diameter core, the clutch 112 slips slightly. As the reel 105 becomes filled and therefore slows in rotational speed, the rate of slip in clutch 112 increases while motor 110 maintains essentially a constant speed.

To rewind tape from reel 105 to 101 the reversing switches 114 and 115 are thrown, switch 118 is opened and switch 119 closed. The tape is removed from the capstan 103 to a position behind the rubber puck 104 but out of contact with the puck. This permits the tape to travel directly to the supply reel 101 while motor 110 acts as a brake to maintain the tape under tension.

The rotational inertia of the capstan 103 damps out the effects of small variations in force due to brake friction irregularities on the supply reel 101 and clutch friction irregularities on the storage reel 105. The support afforded by the capstan surface and the friction between the tape and the capstan surface damp out elastic vibration in the tape when it is at a position adjacent the recording or reproducing heads. Motors 110 and 111 maintain the record member under tension while passing between the reels 101 and 105. It is possible for two mechanical periods to be present in our tape-drive apparatus, one arising from eccentricity in the capstan 103, and the second from eccentricity in the driving puck 104. However, it is relatively simple to machine the capstan 103 in its own bearing so that a tolerance of ±.001" is maintained in its diameter. This results in a maximum tape speed variation due to capstan eccentricity of only ±.004%. A 1.6" diameter rubber puck 104 machined to an accuracy of ±.001" may have peripheral instantaneous speed variations of ±0.0625% due to eccentricity alone.

Assuming that the mass of the capstan and the elasticity of the puck do not absorb the peripheral speed changes but transmit them completely to the tape, this would represent 0.0625% flutter at 30 c.p.s. In our system of recording and reproducing, assuming the worst effect where the eccentricity is additive, this can represent 0.125% change in adjacent line lengths on the kinescope screen. For a 10" screen this would produce relative maximum displacements of only 0.0125" at the end of each line. This amount of displacement is reduced essentially to zero at the start of the lines and is proportionately less than 0.0125" for intermediate points on the lines.

For comparison, we may consider a standard television picture representing a 10-foot wide scene. If an object in the picture moves 0.0125 feet in 1/60 second, or 0.75 feet in one second, the vertical edges of the object will be televised with the same displacement between adjacent lines. Since this motion of 0.75 feet per second is relatively slow and the resulting mismatch of adjacent lines is not considered disagreeable in present practice, we believe the "flutter" resulting from puck eccentricity to be within acceptable limits.

The eccentricity of the capstan, which may easily be kept within ±.004% with a period of 2 c.p.s., is unnoticeable in the final picture.

Our tape recorder, as illustrated, is designed to utilize magnetic recording tape 2.0" wide and to record thereon twenty-four parallel tracks for the twenty-four video signal channels plus one additional track for the audio signal which usually accompanies a television picture. It is desirable that the magnetic tracks be as wide as possible in order to maintain a high signal-to-noise ratio and in order that changes in tape width resulting from variations in relative humidity do not cause tracks recorded under one humidity condition to be displaced a large proportion of their width from the position of the playback head during reproduction under a different humidity condition.

As an example of this limitation on the narrowness of tracks, the change in width of a 2" wide strip of cellulose acetate backed tape can be calculated for a change in humidity from 20% R.H. to 70% R.H. The coefficient of humidity expansion for such a tape is about $1.5 \times 10^{-4}$ per percent R.H. change. This results in width change of 15 mils in a two-inch wide tape which undergoes a 50% change in relative humidity. Obviously the recorded track should preferably be several times this width and the lands somewhat wider in order that between recording and playback under adverse humidity conditions the tape dimension change does not wholly displace the end track from the playback head nor should an adjacent track come into partial contact with the wrong transducer head.

It is also desirable to maintain the track widths and the unrecorded strips, called "lands," between the individual tracks as narrow as possible in order that a minimum amount of tape may be used for any given transcription time. However, if the lands are too narrow, an effect known as "fringing," or the extension of recorded flux beyond the track, will cause "cross talk" between channels. While it is possible to make various compromise choices of track and land widths, we have found that a practical system having good signal-to-noise ratio and a sufficiently low value of "cross talk" is obtained if the track widths are chosen as 0.050" and the land width as 0.020". Thus twenty-five tracks and twenty-four lands occupy a tape width of 1.73", leaving an unrecorded margin of 0.135" on each edge of our 2.0" tape member.

A second form of interchannel "crosstalk" occurs through inductive coupling between transducer heads during the recording process. Inductive coupling may be reduced to a workable lower limit by the introduction of magnetic and electric shielding between heads. It is not practical with known methods of shielding to place recording heads within 0.020" of one another and maintain a sufficiently low level of "cross talk." It is customary in recording practice to stagger the heads to allow for better shielding and many methods of so arranging heads are possible. We have found it to be satisfactory to divide our transducer heads 107 into two banks 120 and 121, as shown in Fig. 28, where the recording heads 107, are separated by magnetic shields 22. The shields comprise plates 126 and 127 and are formed of alternate sheets of high electrically conducting and magnetically permeable metals. For the electrically conducting metal, copper, silver or bronze may be used, while for the magnetically permeable sheets we prefer to employ a good quality of silicon steel. Each of the copper and steel sheets is 0.010" thick and we prefer to make our shields of 5 silicon steel sheets and 4 copper sheets. In this way the separation between adjacent heads in each bank is 0.090". When the heads 107 of one bank 120 are centered on the spacers or shields 122 of the other bank 121, as shown in Fig. 28, and the tape is driven in the direction indicated during the recording step, a plurality of tracks will be recorded, each of which is 0.050" wide, with 0.020" lands separating each track. This close spacing of tracks is accomplished, without appreciable "cross talk," through the system of head staggering and magnetic shielding described.

Conventional micrometer adjustments (not shown) are supplied to the two banks 120 and 121 of transducer heads so that they may be accurately aligned perpendicular to the length of the tape. Adjustments are also provided so that the distance between the head gaps in the two banks may be set to some standardized value. This is desirable in order that tapes recorded on one machine may be played back on any other machine. It should be pointed out that extreme precision in setting the standardized distance between head gaps is not required by our system, nor is precise alignment of the gaps in each bank of heads required. As will be seen as our description proceeds, our system is designed to operate with reproducing heads whose position varies from the relative position of the recording heads by many thousandths of an inch.

One method of constructing suitable multiple recording and reproducing heads for the magnetic recording of multiple channel signals is shown in Figs. 24–27. The component parts include a half head core 123, a mounting block 124 for a full head core, a spring 125 for maintaining a half core in the mounting block, shielding plates 126, 127, and an assembly stand 128 upon which the recording heads and shields are mounted.

Figure 24B:
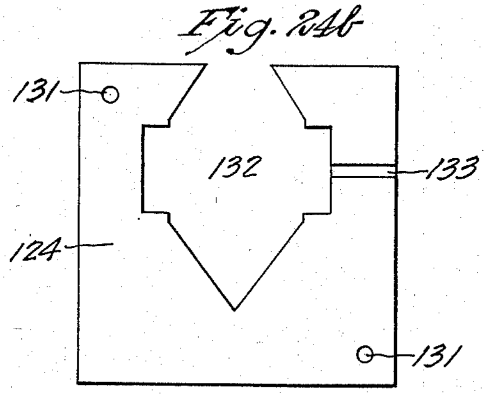

The half head core 123 is formed of five laminations of magnetically permeable metal such as silicon steel, having the shape shown and a thickness of ten mils each. These laminations are stacked to form a magnetic core fifty mils thick corresponding to our preferred recording track width. The laminations are held together with a thin insulating layer of cement such as shellac. As shown in Fig. 24*a*, a coil 129 consisting of a number of turns of insulated copper wire is wound about the center of the core and is held in place with a cement; shellac again being suitable. Leads 130 to the coil are provided as connections to the coil.

The mounting block 124 is constructed of non-magnetic metal, such as brass or aluminum, and has a thickness of fifty mils corresponding to the thickness of the head core. As shown in Fig. 24*b*, it is provided with holes 131 which serve as guides for finally assembling the mounting block in the completed head structure. The block 124 is also provided with a centrally-located aperture 132 formed to hold two half-heads 123 and a pair of retaining springs 125. A channel 133 is cut in one face of the block 124 to permit the terminals 130 to be brought outside the mounting block.

Figure 24C:
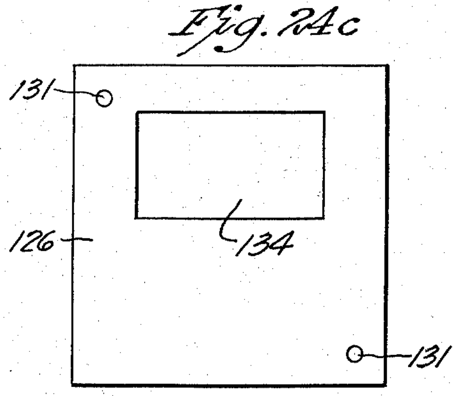
Figure 24D:
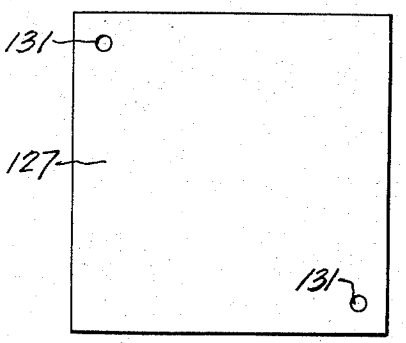
Figure 24A:
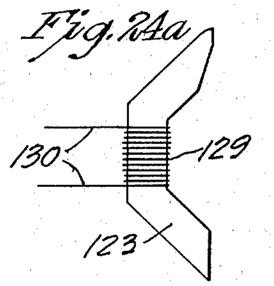
Figure 24E:
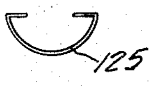

Retaining springs 125 are formed of Phosphor bronze ribbon fifty mils wide in the shape illustrated in Fig. 24*e*. The springs hold the two half cores of the head in the mounting block, as shown in Fig. 26.

One of the shielding plates 126 is provided with guide holes 131 and a central opening 134, as shown in Fig. 24*c*. All of the shielding plates 126 are made from a highly magnetically permeable metal, such as silicon steel, and are ten mils thick. The opening 134 is of such position and size as will allow the shield plate 126 to be placed directly on the assembly block 124 without interfering with the wire of coil 129, whose turns project slightly above the face of the assembly block.

A second shielding plate 127 is provided with guide holes 131 but no other opening. The shielding plates 127 are formed of different types of metal, one type having high magnetic permeability, such as silicon steel, and the other good electrical conductivity and low magnetic permeability, such as copper or brass.

The assembly stand 128 (Fig. 25) may be made of non-magnetic metal, such as brass, and is provided with two threaded guide pins 135 of such dimensions and position as to fit snugly into holes 131 of the mounting block 124 and of the shields 126 and 127.

Figure 26 illustrates the first step in assembling the recording heads. Two half-cores 123 are inserted in aperture 132 of block 124. A strip 136 of non-magnetic material, such as aluminum foil, about one mil thick, is inserted in the recording gap to act as a spacer for the gap. The half-heads 123 are brought into contact and held in position in the mounting block by inserting springs 125 in the position shown.

Figure 27 illustrates the assembly of mounting blocks 124 and shielding plates 126 and 127 on the assembly stand 128. Plate 126 is first pressed on the guide pins 135 and brought into contact with the base 128. A head assembly mounted in block 124 is then placed upon the shielding plate 126. This is followed by a second shielding plate 126 for coil protection. Seven laminations 127 are then added, alternating copper and silicon steel plates. Finally another plate 126 is pressed into place as protection for the coils 129 of the second head.

This method of stacking heads 107 and shielding plates 126 and 127 is continued until the required number of heads are in position. A second plate 128 is then pressed on pins 135 and bolted firmly in place using brass nuts on the threaded ends of the guide pins. We are thus provided with a group of multiple recording heads having the preferred head width of fifty mils and spacing between adjacent heads of ninety mils.

To accommodate the twenty-four video recording channels and one audio channel of our preferred wide band recorder, two such head assemblies 106 and 107 are required, one assembly containing twelve and the other containing thirteen recording heads. In the embodiment of our invention, shown in Figs. 29–33, of a recording machine utilizing storage tube input and output, twenty-six tape tracks are required and therefore two head assemblies, each consisting of thirteen heads, are needed.

A block diagram of one channel of our kinescope circuit is shown in Fig. 22. No elements of this circuit are common to all channels except the twenty-four beam kinescope tube. The signal from one of the twenty-four recorded video tracks is led to a D.C. restorer 141 where the black level of the signal is established. The signal is then fed to the grid of one electron gun of the kinescope 142. Synchronizing pulses are separated from the signal and amplified in the Sync Pulse amplifier 143. The output of amplifier 143 is differentiated by one circuit 144 and the resulting positive pips used to synchronize the horizontal deflection generator 145. The output of the deflection generator is amplified in amplifier 146 and applied to the horizontal electrostatic deflection plates of one of the electron guns of the multiple-beam kinescope 142. The horizontal deflection bias 147 provides a constant D.C. voltage to the horizontal deflection plates of the beam to coordinate the horizontal alignment of the light spot with the position of the other twenty-three scanning spots.

A second circuit 148 integrates the output of the Sync Pulse amplifier 143. The integrated signal is used to synchronize the vertical deflection generator 149. The output of deflection generator 149 is amplified in amplifier 150 and is fed to the vertical electrostatic deflection plates for the electron beam representing this channel. A vertical deflection bias 151 is fed to the vertical deflection plates to align the beam vertically to match the positions of the scanning beams on strips above and below the strip covered by the beam representing this channel.

In the embodiment of our complete kinescope circuit as illustrated and described, twenty-four channels of this type are provided and each channel controls one of the twenty-four scanning beams. The picture area on the screen of the kinescope is divided into twenty-four strips A–X, as shown in Fig. 1. Each strip is scanned by its corresponding beam according to the interlaced scanning pattern shown in Fig. 2. Each scanning pattern may be moved vertically or horizontally by adjustment of the deflection biases. The patterns may be altered in height or width by adjustment of the deflection amplifiers. This allows reassembly of the picture strips into a unified picture representing the image focused on the targets of the camera tubes during the recording process.

In view of the foregoing, the reason we do not require precise mechanical positioning of the recording and reproducing heads is believed to be apparent. Each signal channel is arranged to operate independently of all other channels. The recorded tape track of each channel carries its own synchronizing and blanking pulses. Each beam of the kinescope is supplied with an independent deflection system. Each of the twenty-four rectangles A–X of our kinescope is traced in a fashion which is independent of the tracing of adjacent rectangles. The persistence of illumination of the phosphor in the kinescope screen and the persistence of vision of the human eye permits us to operate our multiple beam kinescope with relatively large differences in timing of the traces for various rectangles. In other words, it is not necessary that in the reproduction process precise coincidence in time of all twenty-four sets of synchronizing pulses be maintained.

As an example of how loss of simultaneity of synchronizing pulses may arise during the reproduction process, we may assume that the position of all of the magnetic heads on the reproducing machine are precisely the same as those of the recording machine with the exception of the $n^{th}$ reproducing head. Suppose the $n^{th}$ head to be advanced 0.10″ from its proper position in the direction of motion of the tape. In such a reproducing machine where tape is advancing at 150 inches per second all of the synchronizing pulses in twenty-three tracks would be reproduced simultaneously but the pulses of the $n^{th}$ track would lag by about 667 micro-seconds. Since kinescope phosphors are designed to have a light decay time of about 33,333 micro-seconds and the eye cannot detect time lags of less than about 70,000 micro-seconds, the assumed delay of 667 micro-seconds in the appearance of the picture on the $n^{th}$ kinescope strip is far below the limit of detection by an observer.

We believe this feature of our invention which permits relatively large errors in positioning of recording and reproducing heads to be of great practical importance. It allows for ease in manufacturing the recording and reproducing machine and in addition, is able to absorb errors in pulse spacing which may arise from certain physical distortions in the recording tape.

Through the use of a specially constructed multiple beam kinescope tube, it is possible to reassemble the multiple channel, relatively low frequency recording into a picture which may be observed directly. If desired, our system may be used to construct multiple beam projection tubes which may be used to project the picture on a screen where it may be seen by a large audience. It is possible to retelevise the picture formed on our multiple beam kinescope screen by use of a television camera directed on the kinescope screen. In this manner the new camera signal so generated may be broadcast in the conventional manner.

The systems heretofore described operate with many relatively slowly moving beams scanning divisions of a camera target and employ a single synchronizing pulse generator that is common to all beams. The beams scan their assigned areas with identical timing.

We do not intend to imply that identical timing of the several scans is necessary to all embodiments of our invention. Thus our invention includes a system utilizing a plurality of storage tubes wherein the relatively slowly moving electron beams scan identical patterns but do so, not with identical timing, but one following an orderly sequence of times.

In this embodiment, employing a system having $n$ channels, our signal source is a standard television camera which is arranged to control the writing beams of $n$ storage tubes operating on a standard television scan. Blanking of the writing beams is arranged so that $1/n$ of the active picture lines is written in sequence on each tube target. Reading beams in each tube scan at a slow rate to recover the written information at reduced frequency. The output of each tube is recorded along with its synchronizing and blanking pulses on one of $n$ tracks on a magnetic tape. The synchronizing and blanking pulse generator, shown in Figs. 10–14, may also be employed with obvious alterations, in this modification of our invention.

In reproduction the process in the storage tubes is reversed. The slowly moving beams write the picture into the storage tubes and the information is recovered by reading beams traveling at the speed of a standard television scan. The combined signal from the memory tube bank forms a picture signal which may be used for broadcast purposes.

In a television camera tube a pattern of charges is produced on the target through the process of photoelectric emission. The higher the light intensity at any given point of the target, the more positive that spot becomes through the loss of electrons to the collector. The camera signal is generated by scanning the target with a beam of electrons some of which replace electrons lost through photoemission thus causing a corresponding flow of electrons to the signal plate which generates the camera signal.

In storage tubes a means is offered for altering the surface charge of a target by means of secondary emission or by conduction induced in a thin insulator by electron bombardment. Any such means may be employed to lay on the storage tube target a distribution of charges similar to that in a camera tube. This charge distribution may then be scanned and a television signal recovered just as it is done in camera tubes.

Generally speaking, the resolution obtained through the use of secondary emission for writing on a storage tube target is relatively poor. Not all of the secondaries find their way to the collector but many fall back to the target tending to neutralize the positively charged areas. We prefer, therefore, to use storage tubes which operate on the principle of conduction induced by electron bombardment where the charge is confined to the neighborhood of the point bombarded and good resolution may be maintained.

A diagrammatic illustration of a storage tube designed to operate on bombardment conduction is shown in Fig. 29. Reference character 162 indicates a thin insulator of quartz adapted to be penetrated by the writing beam, such as about 0.6 micron thick applied by vapor deposition upon a metal target plate 163. A writing gun 164 delivers a beam 165 of electrons of about 10,000 electron volts energy to the charge-sensitive, high-capacity storage target. The reading gun 166 delivers a beam 167 of about 2000 electron volts energy for scanning the target. The collector plates 168 are normally held at ground potential. In operation, the signal plate is held at about −10 v. The structure of storage tubes of this general type is well-known; see the article by L. Pensak entitled "Picture Storage Tube" in the July 1949, issue of Electronics magazine.

Figure 30 shows a representative curve of secondary electron emission from an insulating surface, such as quartz, as a function of the energy of electrons bombarding the surface. At 10,000 volts, electrons penetrate the thin quartz insulator causing a low value of secondary emission but breaking down the insulation property of the layer. This allows charges to flow in the direction of the field gradient or specifically electrons to flow to the target surface.

In operation, we start with the potential of the quartz surface at collector potential. During the writing process electrons are caused to flow from the signal plate 163 to the surface of the quartz insulator 162 due to the conduction induced by the bombardment of the dielectric by the writing beam 165. During the reading or scanning process, secondary emission is induced by the 2000 volt reading beam 167 which removes the negative charge distribution on the quartz surface 162 and thus restores each point of the surface to collector potential. 2000 volt electrons are chosen for the scanning beam 167 since they have a high value of the secondary emission ratio, as shown in Figure 30, and yet do not penetrate the thin quartz layer 162 sufficiently to cause bombardment conduction.

Storage tubes of the type described may be arranged in systems which permit conversion of the wide frequency band of a standard television signal into a number of relatively low frequency bands for the purpose of magnetically recording the signal. In like manner, a series of storage tubes may be employed to convert the several, relatively low frequency bands obtained on playback of the magnetic recording into a television signal of standard frequency.

Thus a plurality of storage tubes may be employed in the system in which the standard television signal is divided into a plurality of, such as twenty-four, signal channels, each of relatively low frequency. Likewise the twenty-five line, odd line interlaced pattern of Fig. 2 may be used for the slowly moving scanning beams. At the end of each field two lines of the 12.5 lines in the field are blanked during the vertical fly-back period. During this blanked period there is ample time for a writing beam moving at the speed of a standard television scan to write 10.5 lines of picture information on the target of the storage tube in preparation for a reading scan which follows immediately. This is possible since two lines of our slow scan occupy about 2666 micro-seconds while 10.5 lines of a standard scan occupy only about 667 micro-seconds. Thus we preferably employ a system of storage tubes in which the first 10.5 lines of picture signal are written on the first target. This step is immediately followed by writing the next 10.5 lines on the target of the second tube, etc., until essentially the last lines of the picture are written on the 24th target. The reading beams likewise follow a time sequence in that the reading of each target begins approximately immediately following the writing operation on that target.

Since each of the two scanning operations occupy 16,667 micro-seconds when the writing beam is prepared to write the first 10.5 lines of the second field on the target of the first tube, the reading cycle for that tube will have been completed and the reading beam blanked again for the vertical fly-back. This time sequence is followed in each storage tube in the series.

Thus by virtue of the relatively slowly-moving reading beams of the storage tubes of our system, standard television signals from a land line, a camera or a broadcast may be fed into the system from a signal channel and recovered from the system in several channels of reduced frequency. These signals, by means of our system of frequency reduction, can be made low enough in frequency to permit recording them magnetically by presently known techniques.

On playback, the several channels of relatively low frequency may be converted into a standard television signal by reversing the operation of the storage tubes. The writing beams of the storage tubes actuated by the signals from corresponding channels of the magnetic recording write at the slow scanning speed. The standard signal is then recovered by a standard television scan of the reading beams of each tube in which the reading is accomplished during the vertical blank time of the writing beams. The recombined standard signal from the several storage tubes may be used for broadcasting purposes, to operate standard kinescopes for direct viewing or to operate standard projection tubes for the observation of many persons.

As an illustration of our method of recording television signals utilizing storage tubes as frequency transformers, we shall describe in detail the system based upon twenty-four signal channels. As previously pointed out, the number of signal channels may be varied within rather wide limits. In order that proper synchronization be maintained upon playback, it is desirable to record the synchronizing pulses for the standard television scan upon a separate track on the tape. Thus in a preferred embodiment we require a total of twenty-six parallel tape tracks of which twenty-four are allocated to the recording of the video signal together with the special synchronizing and blanking pulses associated with our twenty-five line scan, one track carries standard television synchronizing pulses and the final track carries the audio signal.

The time relationships of the standard synchronizing pulses and the pulses required for the several storage tubes is illustrated in Fig. 31. Time is plotted horizontally in Fig. 31, which is drawn to scale. For simplicity only the vertical blanking pulses are shown, although all of the synchronizing and horizontal blanking pulses are recorded in practice. Line "*a*" shows a standard television blanking pulse sequence and the remaining lines lettered A′–X′ show the pulse sequence of our 25 line scan for each of the twenty-four storage tubes.

The time duration of the vertical blanking pulse for the standard 525 line scan is about 1270 micro-seconds. The duration of the vertical blanking pulse for our system of 25 line scanning is about 2666 micro-seconds. In the standard 525 line scan approximately 667 micro-seconds are required to cover 10.5 lines of the raster.

In our system of recording, where 10.5 lines of the standard raster are written in sequence on each of the storage tubes, it is desirable, as will be seen later, that the writing occur on each tube at approximately the midpoint in time of the vertical blanking pulse for the reading beam. Thus in the recording process if the writing on each storage tube begins at about 1000 micro-seconds after the rise time of the blanking pulse of the reading beam, this condition will be met. Accordingly, the time lag between the rise of the pulse on line A′ and the fall of the pulse of line *a* is made about 1000 micro-seconds. The leading edge of the pulse on line B′ is made to lag 667 micro-seconds behind that of line A′; C′ lags the same amount behind B′, etc.

It is readily understood that in such a system 10.5 picture lines may be written in succession on the targets of the successive storage tubes and that the writing may be arranged as specified to occur during the central portion of time during which the reading beam is blanked. This is important in the process of reproduction where the slowly moving beams write the recorded signal on the targets and the information is recovered by a standard scan during the vertical blanking time of the writing beam. As has previously been mentioned, it is difficult mechanically to build recorder and reproducer machines containing multiple heads of our description with precisely identical gap positions in each of the multiple heads. Similarly recording tapes are of necessity of a flexible construction, which permits some skew motion and elongation during both the recording and reproducing operations. If the synchronizing pulses on the standard track are used to control the standard scan on playback, mechanical displacements cannot be allowed to affect the reading operation. As may be seen, our system of recording which allows about 1000 micro-seconds between each end of the blanking pulse and the recorded 10.5 lines also allows approximately $\pm 1000$ micro-seconds error in the reproduction operation. In a previous calculation we have shown that 667 micro-seconds is the time equivalent of 0.10″ of mechanical displacement of the tape. Having 1000 micro-seconds of allowable time error is therefore the equivalent to having 0.15″ of permitted tape or head misalignment.

To illustrate this point in the form of an example, suppose the tape track carrying the recorded standard synchronizing pulses shown in line "*a*," Fig. 31, which pulses are utilized to control the reading beam during reproduction of the recording, is displaced by tape skew or physical distortion of the tape by the relatively large amount of as much as 0.15″ in either a leading or lagging sense from the correct position of the recorded blanking pulses on any of the tracks A′ through X′, our reproducing cycle will not be disturbed. This is true since the reading beam will still operate on each storage tube during the blanking period of the writing beam for that tube.

It is our experience, in connection with the use of magnetic tapes as storage members in digital computers where pulses are recorded in seven parallel tracks across a half-inch tape, that tape skew and distortion limits the number of pulses per linear inch of tape which may be read simultaneously on playback to about one hundred. This implies that relative displacements of pulses of several thousandths of an inch across a half inch of tape are common in practice. We believe, therefore, that in the present state of the magnetic recording art, it is highly important to design recording and reproducing systems which allow for mechanical errors in machine construction and for certain unavoidable tape distortion. We obtain a large factor of safety, as we have shown, through the wise utilization of time available during the vertical blanking of the writing beams of our storage tubes during the reproducing process.

A block diagram of the arrangement of parts for obtaining the synchronizing pulses and one channel of the video signal for recording is shown in Fig. 32. Input from the camera, cable or broadcast is fed into a synchronizing pulse separator 170 which supplies these pulses to one channel of the multiple track tape recorder. These pulses are also fed into the synchronizing and blanking pulse generator 171 and serve as a means for synchronizing the generator with pulses from the line. While this equipment is more complex than a standard pulse generator, its complexity resides merely in requiring a greater number of component circuits. Since its design is well within the powers of engineers trained in television, no detailed description is required other than to describe its output characteristics. The horizontal and vertical deflection for the writing beam is supplied in the conventional manner by sawtooth scanning generators 175 actuated by pulses from the synchronizing pulse separator 170. Standard blanking for the writing beam is supplied as part of the input signal which is applied to the grid of the writing gun. Since only 10.5 lines per field are required to be written on each storage tube target, the synchronizing and blanking pulse generator 171 is required to supply switching voltages to an electronic blanking switch 172 which opens the input circuit at all times except during the writing time for the 10.5 lines. These functions are indicated in Fig. 32 by a direct connection between the pulse generator 171, the input side of the storage tube 173 and the electronic switch 172.

A second function of the pulse generator 171 is to supply the system of horizontal and vertical blanking pulses of our twenty-five line scan as shown in Fig. 3 to the grid of the reading gun and to supply synchronizing pulses shown in Fig. 3 to the output amplifier 174 which is fed from the target of the storage tube 173.

The third function of the pulse generator 171 is to supply timing pulses to the sawtooth scanning generators 176 for the reading beam.

In our system which, in the embodiment described, requires twenty-four video channels, of which only one is shown in Fig. 32, we require separate storage tubes 173, scanning generators 176 for reading and output amplifiers 174 for each channel. The synchronizing pulse separator 170, the synchronizing and blanking pulse generator 171 and the scanning generators 175 for writing are common to all channels. The output of our signal generator consists of twenty-five channels, one containing only synchronizing pulses ad the other twenty-four containing video information at relatively low frequencies.

The recording circuits for each of the twenty-five channels from the signal generator are identical with those described for use with the multiple beam camera tube and are shown as a block diagram in Fig. 17.

The tape transport may be identical with that shown in Figs. 21 and 23. However, because of the requirement for an additional track of recording to carry synchronizing pulses, an additional recording head unit must be added. Twenty-six tracks and twenty-five lands of the dimensions previously specified require a tape width of 1.80 inches. With a tape 2.0 inches wide this allows an adequate margin of 0.10″ on either edge of the recorded strip.

In the embodiment of the reproducing system utilizing a kinescope for reassembling the signals from twenty-four recorded tracks, there was no preferred position for the audio track. In our presently described system in which storage tubes are used to assemble the signals from the various tracks there is a preferred position for both the audio track and the track carrying the standard synchronizing pulses. We prefer to position the synchronizing track as the central track of twenty-five tracks with twelve video tracks on either side. The audio track is placed on either edge of the tape. With the synchronizing track placed essentially in the center of the tape, the permissible skew motion of the tape is double that which could be tolerated if the synchronizing track were recorded on one edge of the tape. With this preferred placement our system of recombining signals on memory tubes will operate with a mechanical displacement of recorded pulses from the first to the last video track of up to 0.3″. This tolerance is far beyond any requirements to allow for tape distortion or head displacement in a practical recording system.

The circuits required for reproducing the several relatively low frequency video signals from the several recorded tracks are shown as a block diagram in Fig. 33. Synchronizing pulses from the standard synchronizing track are picked up by a magnetic head and are fed to a pulse generator 177. These pulses are used to synchronize the master oscillator of the generator and assure the proper time relationship exists between the scanning of the storage tube 179 by the reading and writing beams. The generator 177 is non-standard in that it utilizes pulses from the tape track rather than power line frequencies to control the oscillators and must supply blanking voltages to the reading beam. Its design is well within the capacity of engineers skilled in television practices. One output of the pulse generator 177 feeds a standard scanning generator 178 which controls the horizontal and vertical motion of the reading beam of the storage tube 179 in a standard television scan. A second output of the pulse generator is applied to the control grid of the reading beam gun and supplies blanking voltages to the grid except for the interval when the 10.5 lines of each field are to be read from the particular storage tube. The same voltage is applied to close an electronic blanking switch 180 during the reading period. The third output of the pulse generator adds synchronizing pulses to the final output signal in the mixer 181.

Each of the twenty-four video channels is supplied with a reproducing head, a sweep generator, a storage tube, an electronic switch and an amplifier of which one channel is shown in Fig. 33. The reproducing head picks up the signal from one video track including picture signal, synchronizing pulses and blanking pulses for the twenty-five line scan of our invention. The composite signal is fed to the D.C. restorer 182 and from there to the control grid of the writing beam of the storage tube 179. The sweep generator is fed from the D.C. restorer and consists of a synchronizing pulse amplifier 183, integrating and differentiating circuits 184 and 185, and a pair of deflection generators 186 and 187 and amplifiers 188 and 189. The output of the amplifiers is used in the conventional manner to cause the writing beam of the storage tube 179 to scan the target in a relatively slowly moving twenty-five line, odd line interlace pattern which we have described. After writing 10.5 lines of this scan, the writing beam is blanked for its vertical fly-back during which period the reading beam moving with a standard television scan recovers the picture signal in the standard television frequency band. The output of the target during the reading cycle is connected to an amplifier 190 by electronic switching circuit 180 which is closed only during the reading cycle, then to mixer 181 where the signals from all twenty-four channels are combined and the synchronizing pulses added.

The output of the mixer is a standard television signal containing the original wide band of frequencies which are generated in a television camera together with the standard blanking and synchronizing pulses. This signal may be utilized in the same manner as any standard television signal.

We have described our system for use of storage tubes in connection with magnetic recording of broad band television signals. We have stated that information is stored on each tube in the form of picture lines. This implies that we utilize only about one twenty-fourth of the active target of a storage tube, such as the Graphicon, which is capable of a resolution of the same order of magnitude as a television camera tube. We do not wish to limit our invention to line scanning. When it is possible, through the use of other scanning patterns, such as, for example, a spiral scan, we may utilize a greater area of the target and through this utilization achieve a higher resolution. Or conversely, it is possible through the use of spiral scanning of storage tubes to obtain television resolution equal to 300,000 elements per frame in our overall reproduced signal with storage tubes capable of resolving only about 20,000 elements per tube. Alternatively, other scanning methods than line scanning offer a means of miniaturizing good storage tubes in that smaller targets would be required.

We have described a system using storage tube frequency transformation in which the reading beam removes the charges produced on the target by the writing beam and prepares the target for the next writing cycle. In practice the written charge is not always completely removed, i.e. the entire target surface reduced to collector potential, by means of a single reading cycle. This gives rise in general to noise superimposed on the read out signal. If a better signal-to-noise ratio is required than may be obtained through "erasure" by a single reading cycle, this enhanced erasing may be attained by providing one or more erasing cycles between each writing cycle. If one erase cycle is carried out at standard television scanning velocities only one additional storage tube is required. Thus, one erase cycle may be caused to follow the reading cycle in each of our twenty-four storage tubes by operating the system with twenty-five such tubes. Two erasing cycles may be provided between the read and write cycles if we use twenty-six storage tubes in our twenty-four channel system.

The circuits and apparatus for accomplishing the additional erasure need not be described to qualified engineers in light of the preceding disclosures. Such engineers will understand also the desirability of increasing the erasing beam intensity and deforcusing it during such erase scans.

In the embodiment of our invention in which a multiple beam camera tube generates the several, relatively low-frequency signals, we described a system in which the several slowly moving scanning beams scanned simultaneously identical patterns. The modification involving the use of storage tubes demonstrates that our principle of frequency reduction of television signals may be accomplished by a sequence of scans by the slowly moving beams.

It is thus apparent that the apparatus herein described may be used for recording the entire television signal, including not only the video information but also the blanking, synchronizing and equalizing pulses which are transmitted with the video information to control the television receiver. Each of the elements forming a part of the apparatus, as described, may take a large number of forms within the scope of the invention. The invention has been specifically described in terms of dividing the standard television signal into twenty-four signal channels of lower frequencies and in terms of a twenty-five line, interlaced scanning pattern. Changes in the number of signal channels and in the scanning pattern are contemplated and are within the scope of the invention. In view of the foregoing detailed description, such modifications are well within the ability of one skilled in the electronics of the recording arts. The invention has been described in terms of recording and reproducing the signals magnetically. The possibility of using other methods of recording has been mentioned.

We do not intend to exclude from our invention combinations which involve one method of generating the multiple-channel signals with another method of reproducing the signals. For example storage tube systems may be used to generate the multiple-channel signals for recording and a multiple-beam kinescope used to recombine the several recorded signal bands into a complete picture.

Thus while the invention has been described in terms of recording and reproducing black and white images, the application of the invention to systems of color television is feasible and obvious, and should not be excluded from the scope of the invention.

Improvements in the manufacture of the electronic elements of the circuits herein described or of the transducer heads or of the magnetic record members will permit the use of slower speeds of the record members about the capstan, the use of fewer signal channels and/or the obtaining of better resolution.

All such modifications are contemplated as within the scope of the invention, and we do not wish to be limited to the specific embodiments of the invention herein described.

I claim:

1. A system for recording signals of a wide band of frequencies comprising an electronic frequency transformer including a plurality of electron guns, means including said electron guns for dividing the wide band signals into a plurality of signal channels each of whose maximum frequency is reduced from the maximum frequency of the original signal band, a record member, means for transporting said record member in a predetermined direction at a constant speed, and a plurality of recording devices at least equal in number to the number of said signal channels, positioned adjacent said record member, means for connecting each of said signal channels to one of said recording devices, and means including said recording devices for recording each of said signal channels as a separate, parallel track on said record member.

2. A recording system as defined in claim 1 in which the maximum frequency of each of the plurality of signal channels is reduced in the frequency transformer from the maximum frequency of the original signal band in a proportion approximately equal to the number of signal channels.

3. A recording system as defined in claim 1 in which the record member is a magnetic tape and the recording devices are magnetic transducing heads.

4. A recording system as defined in claim 1 in which the frequency transformer is a plurality of storage tubes, each having a pair of electron guns, said tubes at least equal in number to the number of separate signal channels to be generated in said transformer, one of said pair of electron guns of each tube being adapted to write a portion of the wide band signals upon the target of the tube at the speed of a conventional television scan, and the other of said pair of electron guns of each storage tube being adapted to read its target at a slower rate than a conventional television scan.

5. A system for recording television or like signals of a wide band of frequencies comprising means for moving a magnetic record member at a constant speed, a plurality of magnetic record heads each positioned to record a separate magnetic track on said record member, a source of signals of a wide frequency band, a plurality of storage tubes each having a target and means for producing an electron writing beam and an electron reading beam, means connecting said source of signals to each of said storage tubes, means for causing the writing beam of each tube to write on its target a portion of the signals from said source at the speed of a conventional television scan and intermittently and in sequence with the other tubes, the means for producing the reading beam of each tube being adapted to cause the reading beam to scan its target at a slower rate than that of the writing beam to recover the target information as signals of maximum frequency lower than that of the original signals, and means connecting each storage tube to a separate record head for transmitting said signals of lower maximum frequency.

6. A recording system defined in claim 5 in which the source of signals includes a generator for producing synchronizing pulses, and including means for connecting said generator for producing synchronizing pulses to a magnetic record head which is independent of the magnetic record heads which are connected to storage tubes.

7. The recording system defined in claim 5 in which the means for causing the writing beam of each storage tube to write intermittently and in sequence include a generator for producing synchronizing and blanking pulses, and means for blanking the signal output of said storage tube and for transmitting the synchronizing pulses to said magnetic head.

8. The recording system defined in claim 5 in which the means for causing the writing beam of each storage tube to write intermittently and in sequence include a synchronizing pulse separator and a synchronizing and blanking pulse generator common to all of the storage tubes.

9. The recording system defined in claim 5 in which the means for producing the electron writing beam of each storage tube include a single scanning generator common to all the storage tubes.

10. The recording system defined in claim 5 in which the means for producing the electron reading beam of each storage tube include a separate scanning generator for each of the storage tubes.

11. The recording system defined in claim 5 in which the means for transmitting said signals of lower frequency include a separate output amplifier for each of the storage tubes.

12. Apparatus for recording television and like signals encompassing a wide band of frequencies comprising a television camera including a lens element, a plurality of pick-up tubes, means for dividing and directing substantially equal amounts of light rays from said lens to each of said pick-up tubes, each tube including a target provided on one surface thereof with a photosensitive mosaic and on the other surface with a plurality of signal plates insulated one from the other, and a plurality of electron guns equal in number to the number of said signal plates and adapted to individually and simultaneously scan predetermined areas of said mosaic, each of said signal plates being at least coextensive with one of said predetermined areas, amplifiers for each of said signal plates, individual deflection plate controls for each of said electron guns, and a pulse generator and a scanning generator common to all of said electron guns; and a magnetic recording device including a transport mechanism for magnetic recording tape and a plurality of transducer heads disposed adjacent to the path of said magnetic record member and adapted to record parallel adjacent magnetic tracks on said member, a separate transducer head being provided for each of said signal plates and being connected thereto through said amplifier, said recording device including a separate transducer head for recording audio signals.

13. Apparatus for magnetically recording television and like signals comprising a magnetic record member, means for transporting said record member in a predetermined direction at a constant speed, a plurality of magnetic transducing heads disposed adjacent the path of said record member and adapted to record parallel adjacent tracks on said record member, a camera tube for generating television and like signals, said camera tube comprising a highly evacuated envelope, a target mounted in said envelope and provided on one surface thereof with a photo-sensitive mosaic, a plurality of electron guns mounted in said envelope, each gun being adapted to scan one of a plurality of predetermined areas of the mosaic simultaneously with the scanning of other areas of the mosaic by said other guns, and a plurality of spaced signal plates on the other surface of said target equal in number to the number of electron guns, each of said signal plates being at least coextensive with one of said separate areas and adapted to generate a signal corresponding to the image on the encompassed area, said apparatus also including means for connecting each of the signal plates of said camera tube to a separate one of said magnetic transducing heads, and means including said connecting means and one of said transducing heads for recording the signal on each of said signal plates on a separate track of said record member.

14. Apparatus for magnetically recording television and like signals comprising a camera tube including a lens and a pick-up tube, said pick-up tube comprising a highly evacuated glass envelope, a target carried in said envelope, a photo-sensitive mosaic mounted on one surface of said target, means for permitting light rays from said lens to produce an image on said mosaic, a plurality of spaced signal plates electrically insulated from one another on the opposite surface of said target, a plurality of electron guns mounted in said envelope and equal in number to the number of said signal plates, each electron gun being adapted to scan simultaneously an assigned area of said mosaic encompassed by one of said signal plates, amplifiers for each of said signal plates, individual deflection plate controls for each of said electron guns and a pulse generator and a scanning generator common to all of said electron guns, said apparatus also including a magnetic recording device including a tape record member and a tape transport mechanism adapted to drive the record member at a constant speed, a plurality of transducer heads mounted adjacent the path of said record member and adapted to record thereon parallel magnetic tracks, means for connecting each of the signal plates of said pick-up tube through its amplifier to one of said transducer heads, and an additional head adapted to record audio signals as a separate track on said record member.

15. A system for reproducing, in a single band, signals of a plurality of signal channels comprising a record member having signals recorded thereon in a plurality of separate tracks, means for transporting said record member in a predetermined direction at a constant speed, a plurality of pick-up devices equal in number to the number of said signal tracks on said record member and disposed adjacent the path of said record member, and a frequency transforming device including a plurality of means for producing electron reading and writing beams each electrically connected to one of said pick-up devices and interconnected to combine the signals of the plurality of signal tracks into a signal channel whose maximum frequency is greater than the maximum frequency of any of said plurality of signal channels.

16. A reproducing system as defined in claim 15 in which the maximum frequency of the combined signal channel is greater than the maximum frequency of said individual channels by a factor approximately equal to the number of channels.

17. A reproducing system in accordance with claim 15 in which the frequency transforming device is a plurality of interconnected storage tubes, means for transmitting signals from one of said signal tracks to each storage tube through said pick-up devices, the means for producing the writing beam of each tube being adapted to write the signal on its target at a speed lower than the speed of a conventional television scan and the means for producing the reading beam of each tube being adapted to read its target at the speed of a conventional television scan.

18. The reproducing system defined in claim 15 in which the record member is a magnetic tape and the pick-up devices are magnetic transducing heads.

19. A system for producing a television or like picture from signals of a plurality of signal channels comprising a record member having signals recorded thereon in a plurality of separate tracks, means for transporting said record member in a predetermined direction at a constant speed, a plurality of pick-up devices equal in number to the number of said signal tracks on said record member and a multiple-beam kinescope having a separate electron gun electrically connected to each of said pick-up devices.

20. A system for reproducing, in a single band of wide frequency range, the signals of a plurality of signal channels comprising a record member having signals magnetically recorded thereon in a plurality of separate tracks, means for moving said record member at a constant speed, a plurality of magnetic transducing heads each positioned to pick up the magnetic signal in one of said tracks, a plurality of storage tubes, each having a target and means for producing an electron writing beam and an electron reading beam, means for transmitting to each storage tube the signal from one of said transducing heads, the means for producing the writing beam of each storage tube being adapted to write the signal received from its transducing head on its target at a rate lower than that of a conventional TV scan, the means for producing the reading beam of each storage tube being adapted to scan the target at a rate approximating that of a conventional television scan, means for causing the reading beam of each tube to read its target intermittently and in sequence with the reading beams of the other tubes, means for combining the output of all of the storage tubes into a single band of signals whose maximum frequency is greater than that of any of the separate signals.

21. The reproducing system defined in claim 20 in which the means for combining the output of the storage tubes include a separate amplifier for the output of each storage tube.

22. The reproducing system defined in claim 20 in which the means for producing the electron writing beam of each storage tube include a separate sweep generator for each tube.

23. The reproducing system defined in claim 20 in which the means for producing the electron reading beam of each storage tube include a separate sweep generator for each tube.

24. A signal recording and reproducing system comprising a magnetic record member, means for transporting said record member in a predetermined direction at a constant speed, a plurality of magnetic transducing heads disposed adjacent the path of said record member and adapted to record parallel adjacent tracks on said record member, a source of signals of a wide band of frequencies, an electronic frequency transformer including a plurality of electron guns, means for transmitting said wide band signals from said source of signals to said frequency transformer, means including said guns for dividing the wide band signals into a plurality of signal channels each of whose maximum frequency is reduced from the maximum frequency of the original signal band, means for feeding each of said signal channels to a separate transducing head, means including said transducing head for recording each of said signal channels on a separate track of said record member, means including said transducing head for playing back each of said signal channels from said record member, means including an electronic reproducing frequency transformer for combining said played-back signal channels to reproduce wide band signals.

25. A signal recording and reproducing system as defined in claim 24 in which the electronic reproducing frequency transformer is a multiple-beam kinescope having a plurality of electron guns equal in number to the number of said signal channels and including means for transmitting each of said signal channels to one of said electron guns.

26. A television camera comprising a lens, at least one pick-up tube containing a total of $n$ electron guns and two separate targets, each target having on one surface a photo-sensitive mosaic and on the other surface about $n/2$ spaced signal plates, means for dividing and directing substantially equal amounts of light rays from said lens to the mosaic of each of said targets to produce essentially identical images on each mosaic, individual deflection plates adapted to control the electron beam of each of said electron guns to scan a rectangular area occupying a separate $1/n$th of the total area of one mosaic simultaneously with the scanning of other areas of said one mosaic by a total of about one-half of the guns and with the scanning of areas of the other mosaic by the other guns, each of said signal plates being at least coextensive with one of said separate rectangular areas and adapted to generate a signal corresponding to the image on the encompassed area.

References Cited in the file of this patent

UNITED STATES PATENTS

| | | |
|---|---|---|
| 1,771,360 | Thurm | July 22, 1930 |
| 1,974,911 | Buecker et al. | Sept. 25, 1934 |
| 2,201,215 | Zworykin | May 21, 1940 |
| 2,213,246 | Heller | Sept. 3, 1940 |
| 2,219,021 | Reisz | Oct. 22, 1940 |
| 2,219,149 | Goldsmith | Oct. 22, 1940 |
| 2,244,365 | Iams | June 3, 1941 |
| 2,275,224 | Henroteau | Mar. 3, 1942 |
| 2,277,516 | Henroteau | Mar. 24, 1942 |
| 2,294,820 | Wilson | Sept. 1, 1942 |
| 2,381,901 | Goldsmith | Aug. 14, 1945 |
| 2,381,902 | Goldsmith | Aug. 14, 1945 |
| 2,454,652 | Iams | Nov. 23, 1948 |
| 2,492,926 | Valensi | Dec. 19, 1949 |
| 2,517,808 | Sziklai | Aug. 8, 1950 |
| 2,521,010 | Homrighous | Sept. 5, 1950 |
| 2,532,917 | Howell | Dec. 5, 1950 |
| 2,561,698 | Hogan | July 24, 1951 |
| 2,698,875 | Greenwood | Jan. 4, 1955 |
| 2,794,066 | Mullin | May 28, 1957 |

FOREIGN PATENTS

| | | |
|---|---|---|
| 365,632 | Great Britain | Jan. 20, 1932 |